US012656883B2

(12) United States Patent
Jo et al.

(10) Patent No.: US 12,656,883 B2
(45) Date of Patent: Jun. 16, 2026

(54) WEARABLE ELECTRONIC DEVICE AND METHOD FOR IDENTIFYING CONTROLLER BY USING WEARABLE ELECTRONIC DEVICE

(71) Applicant: Samsung Electronics Co., Ltd., Suwon-si (KR)

(72) Inventors: Nammin Jo, Suwon-si (KR); Jinchoul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/057,540

(22) Filed: Feb. 19, 2025

(65) Prior Publication Data

US 2025/0190061 A1 Jun. 12, 2025

Related U.S. Application Data

(63) Continuation of application No. PCT/KR2023/011610, filed on Aug. 7, 2023.

(30) Foreign Application Priority Data

Sep. 23, 2022 (KR) ........................ 10-2022-0120855
Oct. 21, 2022 (KR) ........................ 10-2022-0136744

(51) Int. Cl.
*G06F 3/03* (2006.01)
*G06F 3/0346* (2013.01)
(52) U.S. Cl.
CPC .......... *G06F 3/0308* (2013.01); *G06F 3/0346* (2013.01)
(58) Field of Classification Search
CPC ...... G06F 3/0308; G06F 3/0346; G06F 3/017; G06F 3/0304; G06F 3/038; G06F 3/011;
(Continued)

(56) References Cited

U.S. PATENT DOCUMENTS 10,241,573 B2 3/2019 Mallinson
11,175,734 B1 * 11/2021 Hossain ................. G06F 3/014
(Continued)

FOREIGN PATENT DOCUMENTS

JP 2014229362 A 12/2014
JP 2020501263 A 1/2020
(Continued)

OTHER PUBLICATIONS

International Search Report for PCT/KR2023/011610 mailed Nov. 6, 2023, 4 pages with English translation.
(Continued)

*Primary Examiner* — Grant Sitta
(74) *Attorney, Agent, or Firm* — NIXON & VANDERHYE P.C.

(57) ABSTRACT

A wearable electronic device according to an embodiment of the disclosure may include a wireless communication module, a sensor module, a first recognition camera and/or a second recognition camera, and a processor operatively connected with the wireless communication module, the sensor module, the first recognition camera, and/or the second recognition camera, wherein the processor is configured to identify that a first controller and a second controller, each of which an LED disposed therein, are detected within a designated space, through at least one of the first recognition camera and the second recognition camera, transmit, to the first controller, a control signal which causes the LED disposed in the first controller to be operated at a first turn-on time, and transmit, to the second controller, a control signal which causes the LED disposed in the second controller to be operated at a second turn-on time. Various other embodiments are also possible.

17 Claims, 14 Drawing Sheets

(58) Field of Classification Search

CPC ............ A63F 2300/8082; A63F 13/211; A63F
13/213

See application file for complete search history.

(56) References Cited

U.S. PATENT DOCUMENTS

| | | | |
|---|---|---|---|
| 11,204,215 B2 | 12/2021 | Kur et al. | |
| 11,340,460 B2 | 5/2022 | Muldoon et al. | |
| 11,442,274 B2 | 9/2022 | Song et al. | |
| 2002/0003467 A1* | 1/2002 | Musschebroeck ..... | G08C 17/02 |
| | | | 340/3.41 |
| 2009/0033623 A1 | 2/2009 | Lin | |
| 2012/0086345 A1* | 4/2012 | Tran ......................... | F24F 11/30 |
| | | | 315/158 |
| 2015/0258431 A1 | 9/2015 | Stafford et al. | |
| 2016/0357249 A1 | 12/2016 | Webb et al. | |
| 2016/0364910 A1* | 12/2016 | Higgins ................ | A63F 13/213 |
| 2017/0131767 A1 | 5/2017 | Long | |
| 2017/0269685 A1 | 9/2017 | Marks et al. | |
| 2017/0308166 A1 | 10/2017 | Mallinson | |
| 2017/0354875 A1 | 12/2017 | Marks et al. | |
| 2018/0095550 A1* | 4/2018 | Shilo ................... | H04N 13/366 |
| 2019/0050050 A1 | 2/2019 | Jung et al. | |
| 2020/0089333 A1 | 3/2020 | Benson et al. | |
| 2020/0372702 A1* | 11/2020 | Yan ......................... | G06F 3/017 |
| 2021/0204384 A1 | 7/2021 | Yokoyama | |
| 2021/0239983 A1 | 8/2021 | Song et al. | |
| 2021/0365064 A1* | 11/2021 | Liu ........................... | G06F 1/14 |
| 2022/0067949 A1* | 3/2022 | Chen ...................... | G06T 7/246 |
| 2022/0370895 A1* | 11/2022 | Wu ....................... | A63F 13/211 |
| 2023/0106457 A1 | 4/2023 | Jo et al. | |
| 2023/0259205 A1 | 8/2023 | Song et al. | |

FOREIGN PATENT DOCUMENTS

| | | | |
|---|---|---|---|
| JP | 6679747 B2 | 3/2020 | |
| JP | 6761053 B2 | 9/2020 | |
| JP | 2021108421 A | 7/2021 | |
| KR | 20170081727 A | 7/2017 | |
| KR | 20190017143 A | 2/2019 | |
| KR | 20190135870 A | 12/2019 | |
| WO | 2018104732 A1 | 6/2018 | |
| WO | 2021261829 A1 | 12/2021 | |
| WO | 2022169255 A1 | 8/2022 | |

OTHER PUBLICATIONS

Written Opinion of the ISA for PCT/KR2023/011610 mailed Nov.
6, 2023, 5 pages.
Extended European Search Report for EP23762127.1 mailed May
6, 2024, 113 pages.

* cited by examiner

361

362

Right Left

FIG. 9

| | LED (on, off) | LED (on) |
|---|---|---|
| Pattern 1 | | |
| Pattern 2 | | |
| Pattern 3 | | |
| Pattern 4 | | |
| Pattern 5 | | |

WEARABLE ELECTRONIC DEVICE AND METHOD FOR IDENTIFYING CONTROLLER BY USING WEARABLE ELECTRONIC DEVICE

CROSS-REFERENCE TO RELATED APPLICATION(S)

This application is a continuation application, claiming priority under § 365(c), of an International application No. PCT/KR2023/011610, filed on Aug. 7, 2023, which is based on and claims the benefit of a Korean patent application number 10-2022-0120855, filed on Sep. 23, 2022, in the Korean Intellectual Property Office, and of a Korean patent application number 10-2022-0136744, filed on Oct. 21, 2022, in the Korean Intellectual Property Office, the disclosure of each of which is incorporated by reference herein in its entirety.

TECHNICAL FIELD

Various embodiments of the disclosure relate to a wearable electronic device and a method for identifying at least one controller by using the wearable electronic device.

BACKGROUND ART

The use of electronic devices such as bar type, foldable type, rollable type, sliding type, or wearable type electronic devices has increased.

A wearable electronic device has been changed in various forms such as augmented reality (AR) glasses in the form of eyeglasses, virtual reality glasses, video see through (VST) mixed reality (MR) glasses, or a head-mounted display (HMD).

The wearable electronic device may visually provide, to a user, information obtained by synthesizing an environment that actually exists and/or a virtual object composed of graphics, through glasses (e.g., a display).

DISCLOSURE OF INVENTION

Technical Problem

A wearable electronic device may display a virtual object on glasses (e.g., a display) to implement augmented reality and/or virtual reality.

The wearable electronic device enables a user to play a game by using a virtual object displayed on glasses. The wearable electronic device may be associated with a controller (or handler) including at least one light-emitting diode (LED), and execute a virtual game displayed on glasses according to an operation of the controller.

The wearable electronic device may perform an erroneous operation by recognizing a controller of another user when the controller associated with a wearable electronic device of the other user other than a controller associated with itself exists in a designated space.

For example, when a second controller associated with a second wearable electronic device approaches a first wearable electronic device while a game is being executed by the first wearable electronic device by using a first controller, the first wearable electronic device may perform an erroneous operation by recognizing an operation signal of the second controller of the second wearable electronic device other than the first controller associated with itself.

Various embodiments of the disclosure may provide a wearable electronic device which enables, among a plurality of wearable electronic devices and controllers, each wearable electronic device to identify a controller associated with itself.

The technical problems to be achieved in the disclosure may not be limited to the above-mentioned technical problems, and other technical problems not mentioned may be clearly understood, through the following descriptions, by those skilled in the art to which the disclosure belongs.

Solution to Problem

A wearable electronic device according to an embodiment of the disclosure may include a wireless communication module, a sensor module, a first recognition camera and/or a second recognition camera, and a processor operatively connected with the wireless communication module, the sensor module, the first recognition camera, and/or the second recognition camera. According to an embodiment, the processor may be configured to identify that a first controller and a second controller, each of which has an LED disposed therein, are detected within a designated space, through at least one of the first recognition camera and the second recognition camera. According to an embodiment, the processor may be configured to transmit, to the first controller, a control signal which causes the LED disposed in the first controller to be operated at a first turn-on time. The processor may be configured to transmit, to the second controller, a control signal which causes the LED disposed in the second controller to be operated at a second turn-on time.

A method for identifying a first controller and a second controller by a wearable electronic device according to an embodiment of the disclosure may include identifying, by a processor, that the first controller and the second controller, each of which has an LED disposed therein, are detected within a designated space, through at least one of a first recognition camera and a second recognition camera. According to an embodiment, the method may include transmitting, by the processor, to the first controller, a control signal which causes the LED disposed in the first controller to be operated at a first turn-on time. According to an embodiment, the method may include transmitting, by the processor, to the second controller, a control signal which causes the LED disposed in the second controller to be operated at a second turn-on time.

Advantageous Effects of Invention

According to various embodiments of the disclosure, it is possible to enable, among a plurality of wearable electronic devices and controllers, each wearable electronic device to identify a controller associated with itself, thereby preventing the corresponding wearable electronic device from erroneously recognizing another user's controller other than the controller associated with itself.

According to various embodiments of the disclosure, a first controller of a first wearable electronic device and a second controller of a second wearable electronic device have the same light-emission period of LEDs and different timings of a turn-on time, so that the first wearable electronic device can recognize the first controller, based on a light-emission period of the LED and a timing of a first turn-on time, and the second wearable electronic device can recognize the second controller, based on a light-emission period of the LED and a timing of a second turn-on time.

In addition to this, various effects identified directly or indirectly through this document may be provided.

BRIEF DESCRIPTION OF DRAWINGS

In relation to the description of drawings, the same or similar reference numerals may be used for the same or similar components.

Figure 7:
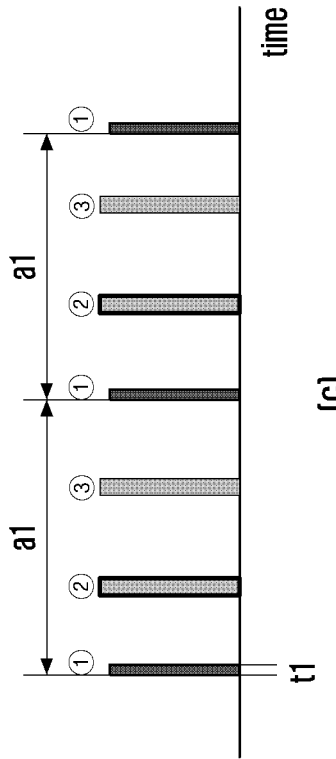
Figure 7:
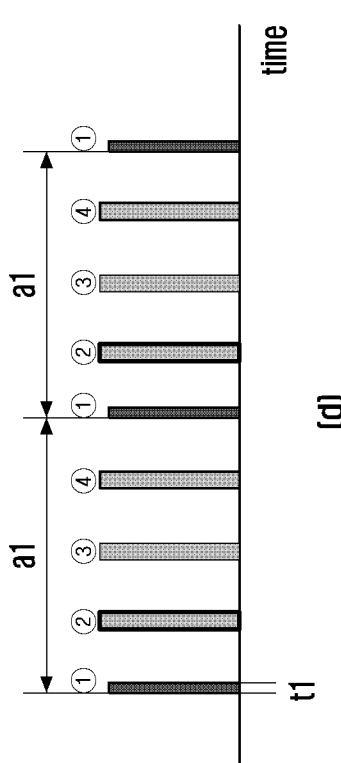
Figure 7:
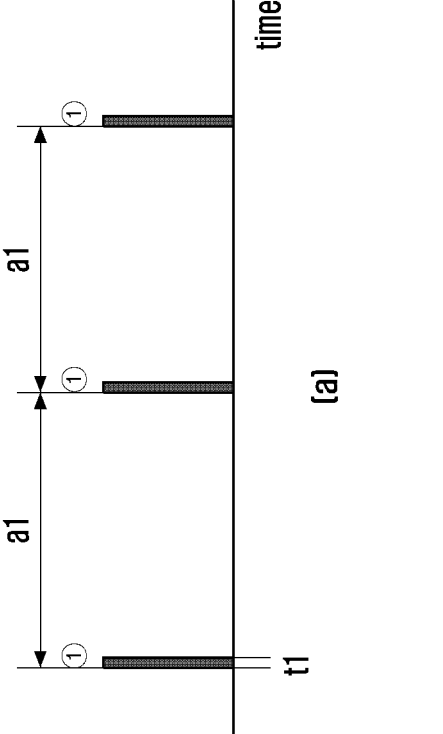
Figure 7:
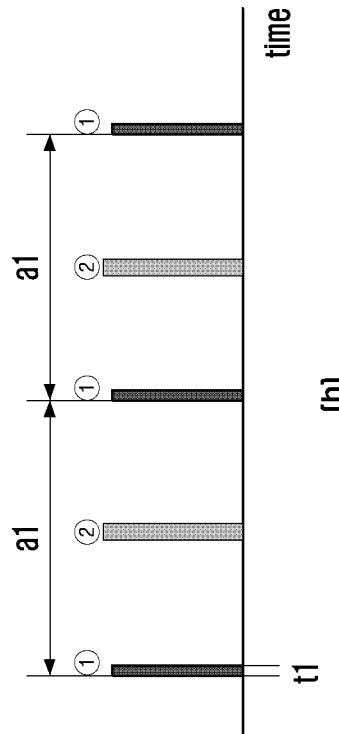
Figure 8:
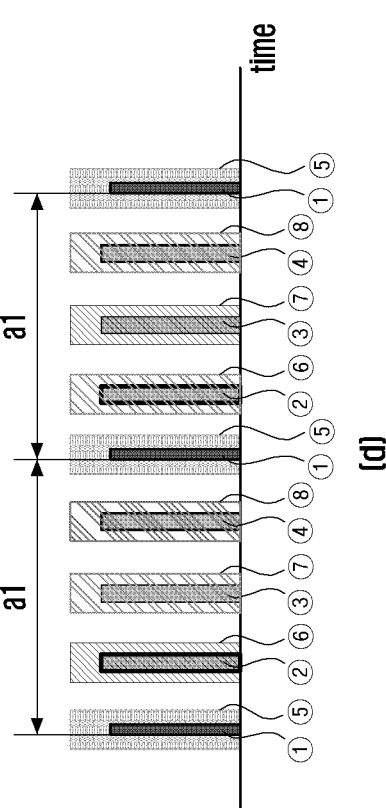
Figure 8:
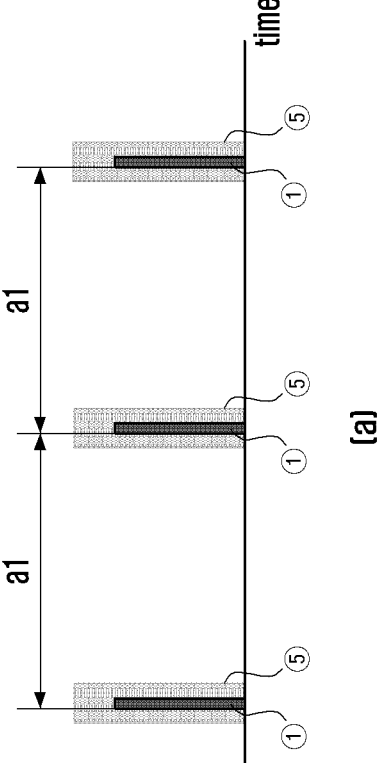
Figure 8:
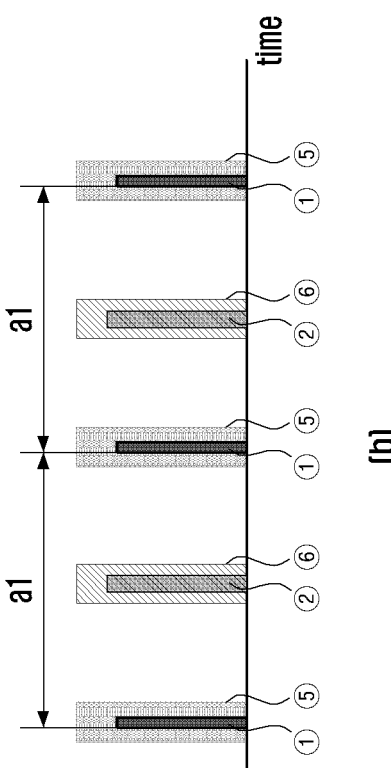
Figure 11A:
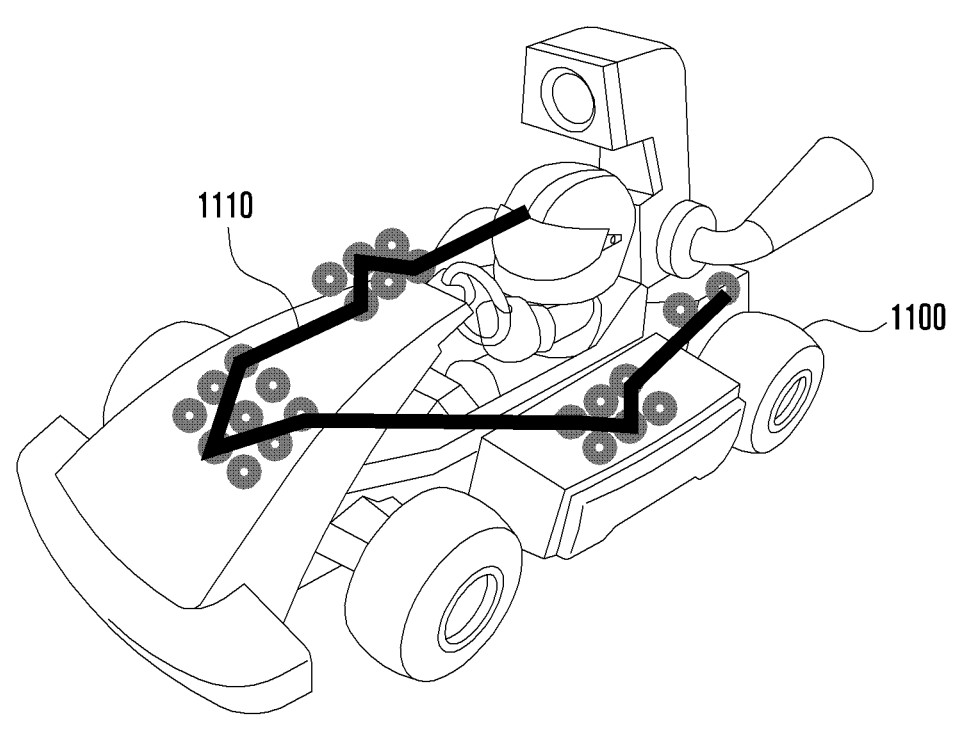
Figure 11B:
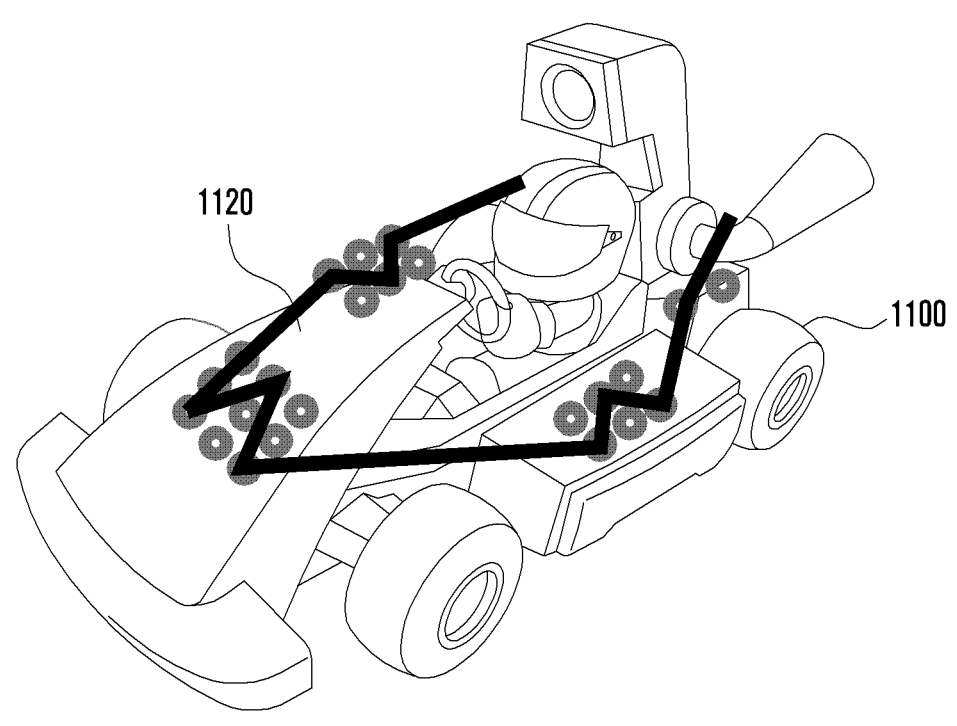
Figure 11C:
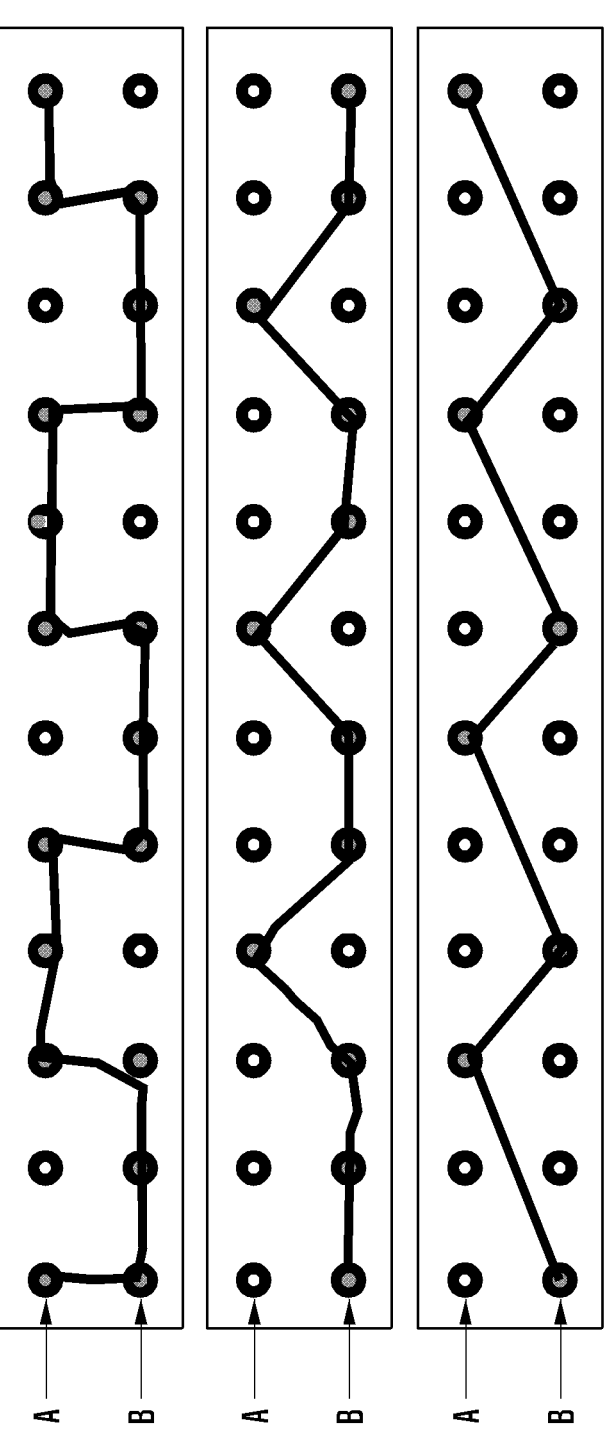
Figure 12:
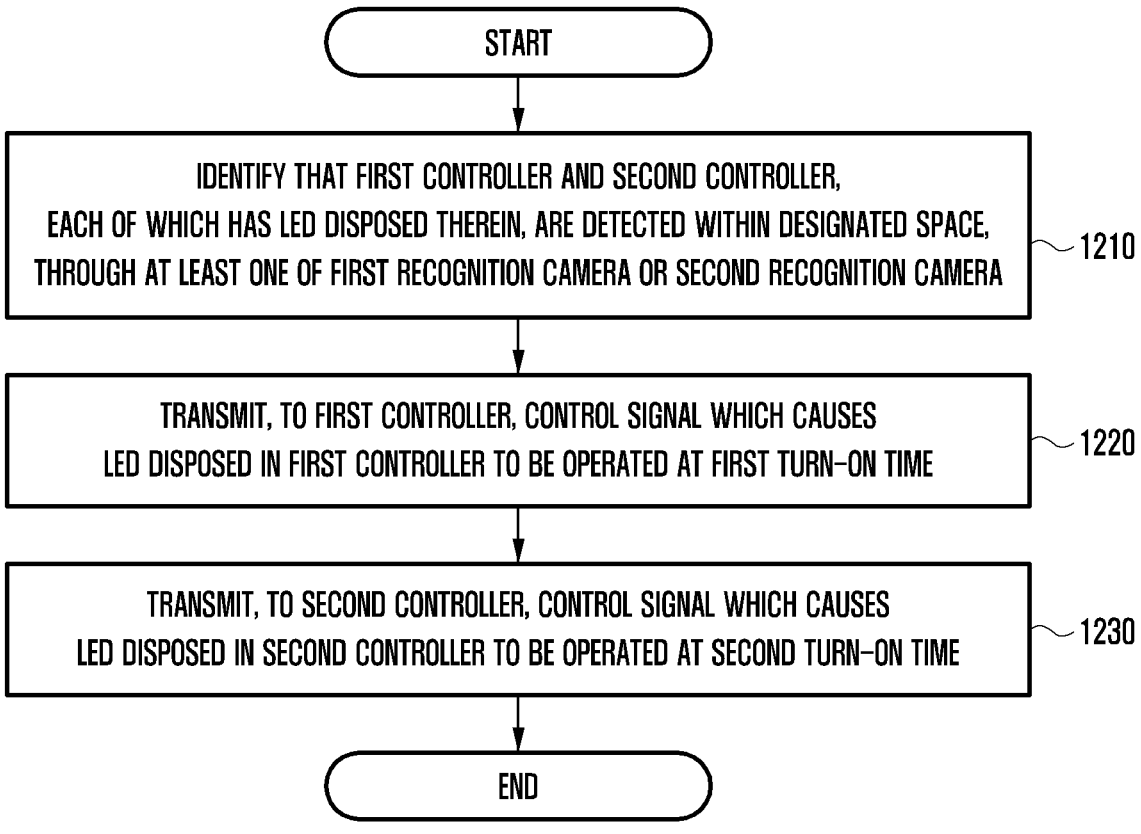

Cases (a) to (d) of FIG. 7 illustrate an embodiment in which a wearable electronic device identifies at least one controller according to an embodiment of the disclosure;

Cases (a) to (d) of FIG. 8 illustrate an embodiment of an operation time configuration when at least one of a first recognition camera or a second recognition camera of a wearable electronic device detects an LED disposed in at least one controller according to an embodiment of the disclosure;

Figure 9:
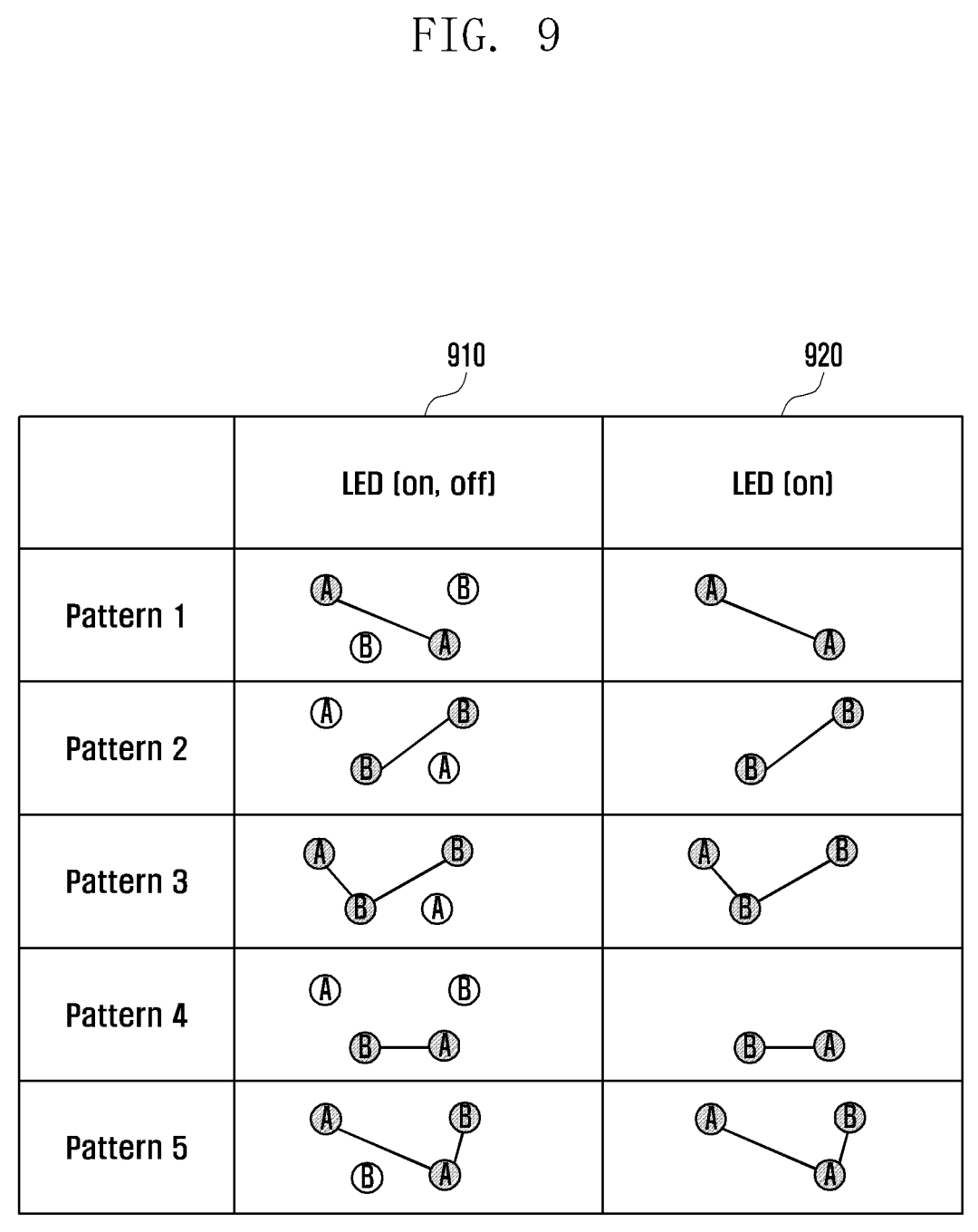

FIG. 9 illustrates an embodiment in which at least one of a first recognition camera or a second recognition camera of a wearable electronic device may detect a light emission pattern of an LED disposed in at least one controller according to an embodiment of the disclosure;

Figure 10:
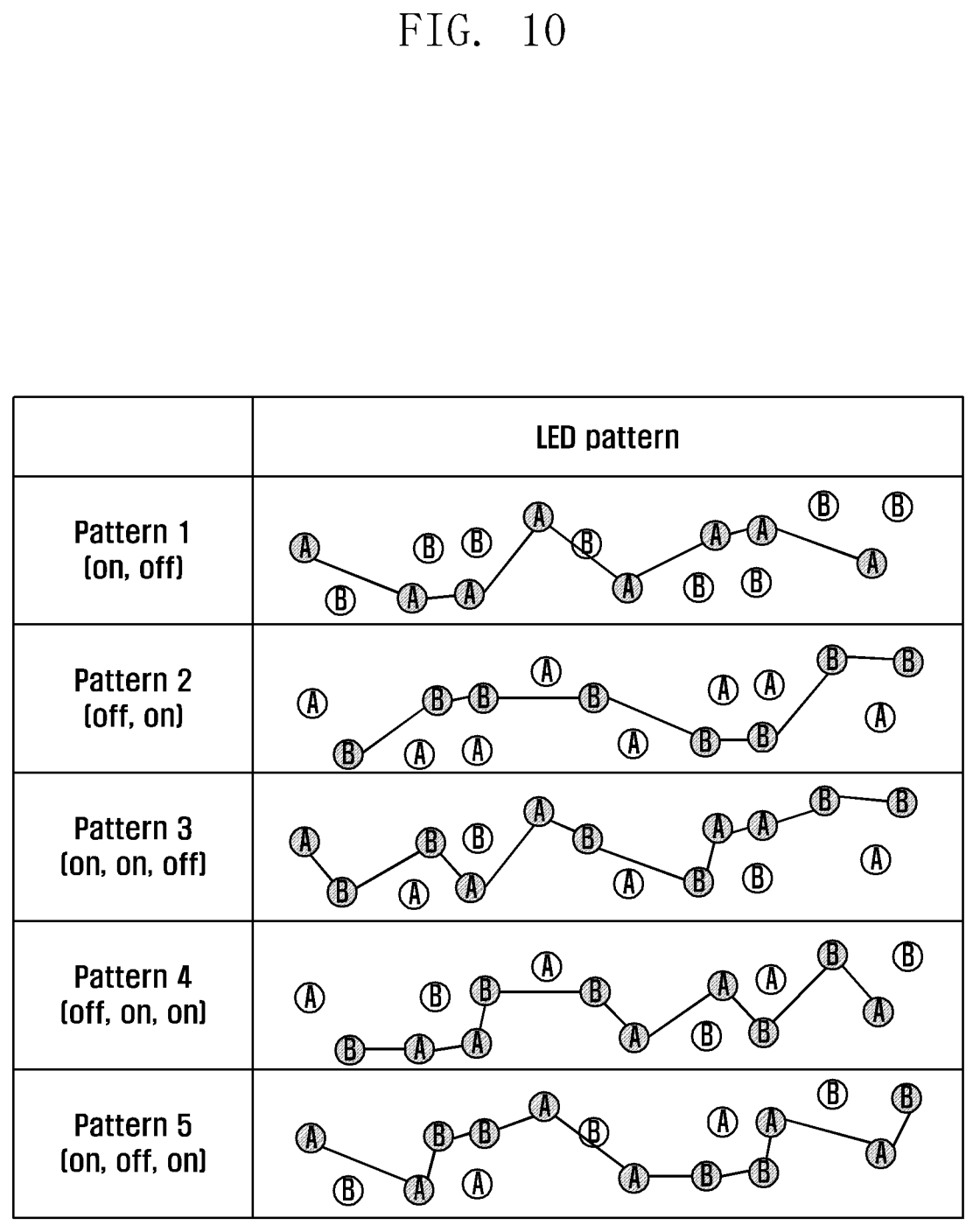

FIG. 10 illustrates various embodiments in which at least one of a first recognition camera or a second recognition camera of a wearable electronic device may detect a light emission pattern of an LED disposed in at least one controller according to an embodiment of the disclosure;

FIG. 11A illustrates an embodiment in which an accessory includes a first pattern according to an embodiment of the disclosure;

FIG. 11B illustrates an embodiment in which an accessory includes a second pattern according to an embodiment of the disclosure;

FIG. 11C illustrates various embodiments of patterns which may be arranged on an accessory according to an embodiment of the disclosure; and FIG. 12 is a flowchart illustrating a method for identifying, by a wearable electronic device, at least one controller by using at least one of a first recognition camera or a second recognition camera according to an embodiment of the disclosure.

MODE FOR THE INVENTION

Figure 1:
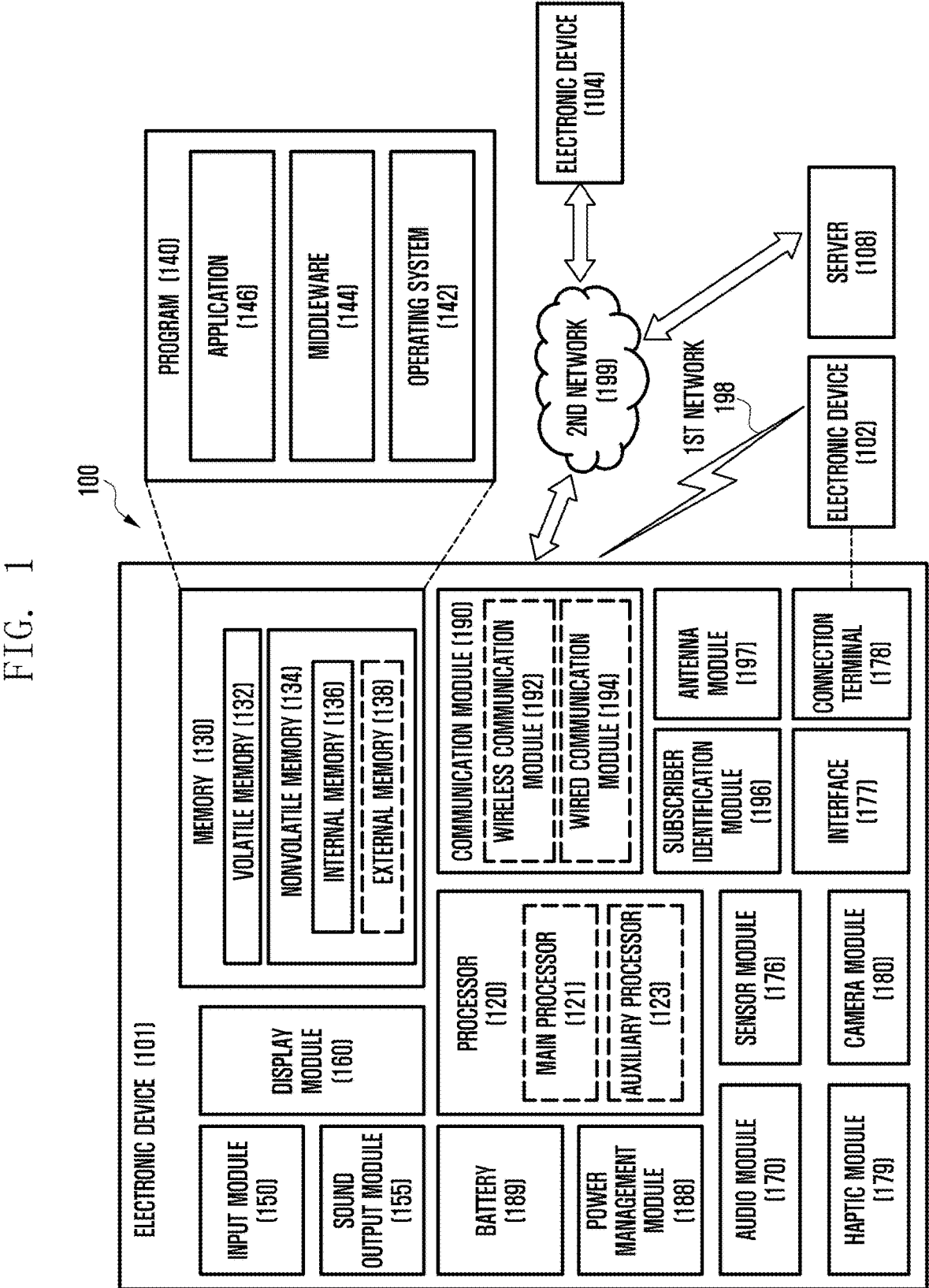
FIG. 1 is a block diagram of an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
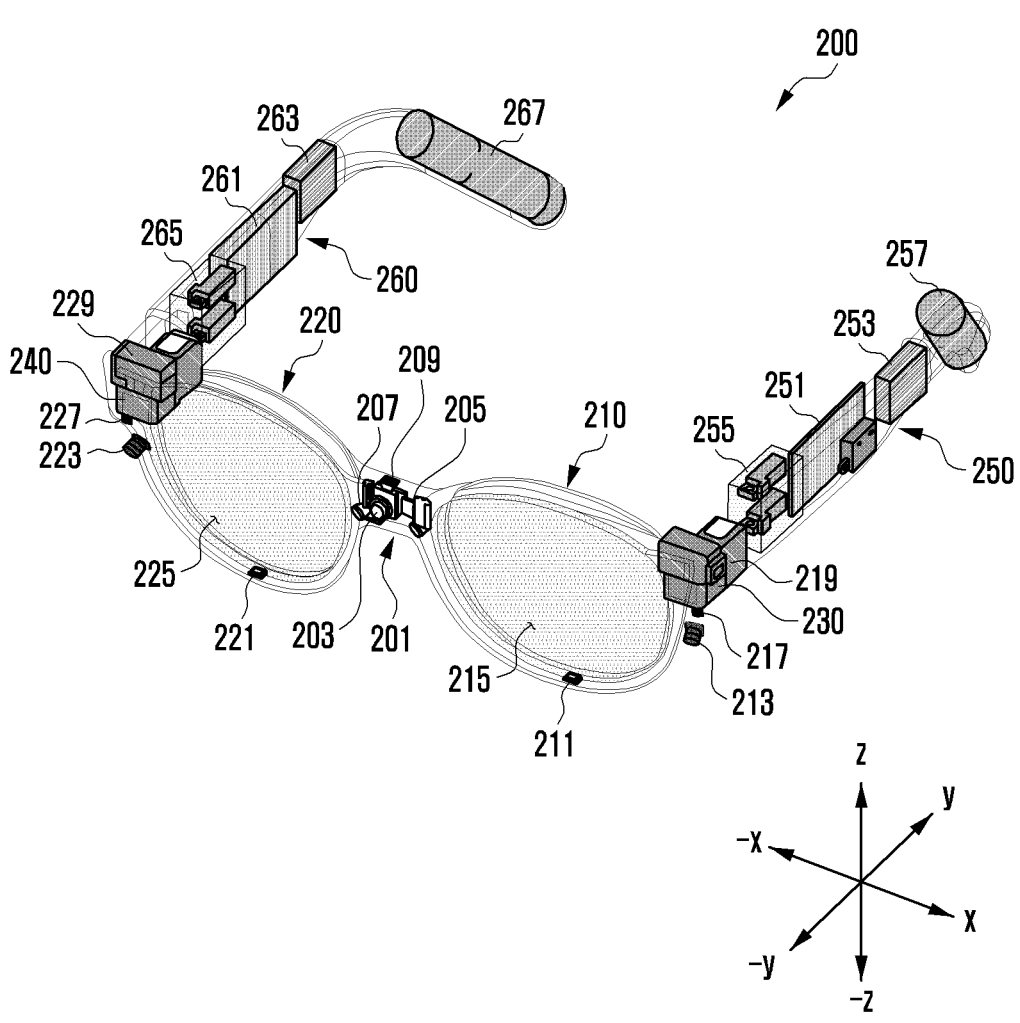
FIG. 2 is a perspective view schematically illustrating a configuration of a wearable electronic device according to an embodiment of the disclosure.

FIG. 2 is a perspective view schematically illustrating a configuration of a wearable electronic device according to various embodiments of the disclosure.

A wearable electronic device 200 of FIG. 2 may include the embodiments described for the electronic device 101 of FIG. 1. The wearable electronic device 200 may include one of augmented reality (AR) glasses (e.g., an AR device), virtual reality glasses (e.g., a VR device), video see through (VST) mixed reality (MR) glasses, and a head-mounted display (HMD).

Referring to FIG. 2, the wearable electronic device 200 according to various embodiments of the disclosure may include a bridge 201, a first rim 210, a second rim 220, a first end piece 230, a second end piece 240, a first temple 250, and/or a second temple 260.

According to an embodiment, the bridge 201 may connect the first rim 210 and the second rim 220. The bridge 201 may be formed of a non-conductive material (e.g., a polymer) and/or a conductive material (e.g., a metal). The first rim 210 and the second rim 220 may be formed of a non-conductive material (e.g., a polymer) and/or a conductive material (e.g., a metal). The bridge 201 may be positioned above the nose of a user when the user wears the wearable electronic device 200. The bridge 201 may separate the first rim 210 and the second rim 220 with reference to the nose of the user.

According to various embodiments, the bridge 201 may include a camera module 203, a first gaze tracking camera 205, a second gaze tracking camera 207, and/or an audio module 209.

According to various embodiments, the camera module 203 (e.g., the camera module 180 of FIG. 1) may photograph the front (e.g., the −y-axis direction) of a user (e.g., a user of the wearable electronic device 200) and obtain image data. The camera module 203 may capture an image corresponding to a field of view (FoV) of the user or measure a distance to a subject (e.g., an object). The camera module 203 may include an RGB camera, a high resolution (HR) camera, and/or a photo video (PV) camera. The camera module 203 may include a color camera having an auto focus (AF) function and an optical image stabilization (OIS) function in order to obtain a high-quality image.

According to various embodiments, the first gaze tracking camera 205 and the second gaze tracking camera 207 may identify the gaze of the user. The first gaze tracking camera 205 and the second gaze tracking camera 207 may photograph pupils of the user in a direction opposite to a photographing direction of the camera module 203. For example, the first gaze tracking camera 205 may partially photograph the left eye of the user, and the second gaze tracking camera 207 may partially photograph the right eye of the user. The first gaze tracking camera 205 and the second gaze tracking camera 207 may detect the pupils (e.g., the left eye and the right eye) of the user and track a gaze direction. The tracked gaze direction may be used to move the center of a virtual image including a virtual object to correspond to the gaze direction. The first gaze tracking camera 205 and/or the second gaze tracking camera 207 may track the gaze of the user by using, for example, at least one manner among an electro-oculography or electrooculogram (EOG) sensor, a coil system, a dual Purkinje system, bright pupil systems, or dark pupil systems.

According to various embodiments, the audio module 209 (e.g., the audio module 170 of FIG. 1) may be disposed between the first gaze tracking camera 205 and the second gaze tracking camera 207. The audio module 209 may convert a voice of the user into an electrical signal or convert an electrical signal into sound. The audio module 209 may include a microphone.

According to an embodiment, the first rim 210 and the second rim 220 may configure a frame (e.g., an eyeglass frame) of the wearable electronic device 200 (e.g., AR glasses). The first rim 210 may be disposed in a first direction (e.g., the x-axis direction) of the bridge 201. The first rim 210 may be disposed at a position corresponding to the left eye of the user. The second rim 220 may be disposed in a second direction (e.g., the −x-axis direction) of the bridge 201 opposite to the first direction (e.g., the x-axis direction). The second rim 220 may be disposed at a position corresponding to the right eye of the user.

According to various embodiments, the first rim 210 may surround and support at least a portion of a first glass 215 (e.g., a first display) disposed on the inner circumferential surface thereof. The first glass 215 may be positioned in front of the left eye of the user. The second rim 220 may surround and support at least a portion of a second glass 225 (e.g., a second display) disposed on the inner circumferential surface thereof. The second glass 225 may be positioned in front of the right eye of the user. The user of the wearable electronic device 200 may view the foreground (e.g., a real image) with respect to an external object (e.g., a subject) through the first glass 215 and the second glass 225. The wearable electronic device 200 may implement augmented reality by overlapping and displaying a virtual image on the foreground (e.g., a real image) with respect to the external object.

According to various embodiments, the first glass 215 and the second glass 225 may include a projection type transparent display. Each of the first glass 215 and the second glass 225 may form a reflective surface as a transparent plate (or transparent screen), and an image generated by the wearable electronic device 200 may be reflected (e.g., total internal reflection) through a reflective surface, and incident to the left eye and the right eye of the user. In an embodiment, the first glass 215 may include an optical waveguide which transmits light generated from a light source of the wearable electronic device 200 to the left eye of the user. For example, the optical waveguide may be formed of glass, plastic, or a polymer material, and may include a nanopattern (e.g., a polygonal or curve-shaped grating structure or a mesh structure) formed on the inside or surface of the first glass 215. The optical waveguide may include at least one of at least one diffractive element (e.g., a diffractive optical element (DOE) or a holographic optical element (HOE)) or a reflective element (e.g., a reflective mirror). The optical waveguide may guide display light emitted from a light source to the eyes of the user by using at least one diffractive element or reflective element included in the optical waveguide. In various embodiments, the diffractive element may include input/output optical members, and the reflective element may include total internal reflection (TIR). For example, an optical path of the light emitted from the light source may be guided to the optical waveguide through an input optical member, and light moving inside the optical waveguide may be guided in the direction toward the eyes of the user through an output optical member. The second glass 225 may be implemented in substantially the same manner as the first glass 215.

According to various embodiments, each of the first glass 215 and the second glass 225 may include the display module 160 illustrated in FIG. 1. The first glass 215 and the second glass 225 may include, for example, a liquid crystal display (LCD), a digital mirror device (DMD), a liquid crystal on silicon (LCoS), an organic light-emitting diode (OLED), or a micro light-emitting diode (micro LED). Although not shown, when the first glass 215 and the second glass 225 are configured by one of the liquid crystal display, the digital mirror display, or the liquid crystal on silicon, the wearable electronic device 200 may include a light source which emits light to screen output areas of the first glass 215 and the second glass 225. In another embodiment, when the first glass 215 and the second glass 225 may generate light by themselves, for example, when the first glass and the second glass are made of either an organic light-emitting diode or a micro LED, the wearable electronic device 200 may provide a virtual image having good quality to the user even without a separate light source. In various embodiments, the first glass 215 and the second glass 225 may be formed of a glass plate, a plastic plate, or a polymer. The first glass 215 and the second glass 225 may be configured to be transparent or opaque.

According to various embodiments, the first rim 210 may include a first microphone 211, a first recognition camera 213, a first light-emitting device 217, and/or a first display module 219. The second rim 220 may include a second microphone 221, a second recognition camera 223, a second light-emitting device 227, and/or a second display module 229.

In various embodiments, the first light-emitting device 217 and the first display module 219 may be included in the first end piece 230, and the second light-emitting device 227 and the second display module 229 may be included in the second end piece 240.

According to various embodiments, the first microphone 211 and/or the second microphone 221 may receive a voice of the user of the wearable electronic device 200 and convert the voice into an electrical signal.

According to various embodiments, the first recognition camera 213 and/or the second recognition camera 223 may recognize a peripheral space of the wearable electronic device 200. The first recognition camera 213 and/or the second recognition camera 223 may detect a gesture (e.g., a controller) of the user within a predetermined distance (e.g., a predetermined space) of the wearable electronic device 200. The first recognition camera 213 and/or the second recognition camera 223 may include a global shutter (GS) camera through which a rolling shutter (RS) phenomenon may be reduced, in order to detect and track a rapid hand gesture of the user (e.g., a controller) and/or a minute movement of a finger of the user. The wearable electronic device 200 may detect an eye corresponding to a dominant eye and/or a non-dominant eye among the left eye and/or the right eye of the user by using the first gaze tracking camera 205, the second gaze tracking camera 207, the first recognition camera 213, and/or the second recognition camera 223. For example, the wearable electronic device 200 may detect an eye corresponding to a dominant eye and/or a non-dominant eye, based on a gaze direction of the user with respect to an external object or a virtual object.

According to various embodiments, the first light-emitting device 217 and/or the second light-emitting device 227 may emit light to increase the accuracy of the camera module 203, the first gaze tracking camera 205, the second gaze tracking camera 207, the first recognition camera 213, and/or the second recognition camera 223. The first light-emitting device 217 and/or the second light-emitting device 227 may be used as an auxiliary means for increasing the accuracy when photographing the pupils of the user by using the first gaze tracking camera 205 and/or the second gaze tracking camera 207. When a gesture of the user is photographed using the first recognition camera 213 and/or the second recognition camera 223, the first light-emitting device 217 and/or the second light-emitting device 227 may be used as an auxiliary means when it is not easy to detect an object (e.g., a subject) to be photographed due to reflected light and mixing of various light sources or a dark environment. The first light-emitting device 217 and/or the second light-emitting device 227 may include, for example, an LED, an IR LED, or a xenon lamp.

According to various embodiments, the first display module 219 and/or the second display module 229 may emit light and transmit the light to the left eye and/or the right eye of the user by using the first glass 215 and/or the second glass 225. The first glass 215 and/or the second glass 225 may display various image information by using light emitted through the first display module 219 and/or the second display module 229. The first display module 219 and/or the second display module 229 may include the display module 160 of FIG. 1. The wearable electronic device 200 may overlap and display an image emitted through the first display module 219 and/or the second display module 229 and the foreground with respect to an external object, through the first glass 215 and/or the second glass 225.

According to an embodiment, the first end piece 230 may be coupled to a portion (e.g., the x-axis direction) of the first rim 210. The second end piece 240 may be coupled to a portion (e.g., the −x-axis direction) of the second rim 220. In various embodiments, the first light-emitting device 217 and the first display module 219 may be included in the first end piece 230. The second light-emitting device 227 and the second display module 229 may be included in the second end piece 240.

According to various embodiments, the first end piece 230 may connect the first rim 210 and the first temple 250. The second end piece 240 may connect the second rim 220 and the second temple 260.

According to an embodiment, the first temple 250 may be operatively connected to the first end piece 230 by using a first hinge part 255. The first hinge part 255 may be rotatably configured such that the first temple 250 is folded or unfolded with respect to the first rim 210. For example, the first temple 250 may extend along a left lateral side of the head of the user. When the user wears the wearable electronic device 200, a distal end portion (e.g., the y-axis direction) of the first temple 250 may be configured in, for example, a bent shape to be supported by the left ear of the user. The second temple 260 may be operatively connected to the second end piece 240 by using a second hinge part 265. The second hinge part 265 may be rotatably configured such that the second temple 260 is folded or unfolded with respect to the second rim 220. For example, the second temple 260 may extend along a right lateral side of the head of the user. When the user wears the wearable electronic device 200, a distal end portion (e.g., the y-axis direction) of the second temple 260 may be configured in, for example, a bent shape to be supported by the right ear of the user.

According to various embodiments, the first temple 250 may include a first printed circuit board 251, a first sound output module 253 (e.g., the sound output module 155 of FIG. 1), and/or a first battery 257 (e.g., the battery 189 of FIG. 1). The second temple 260 may include a second printed circuit board 261, a second sound output module 263

(e.g., the sound output module 155 of FIG. 1), and/or a second battery 267 (e.g., the battery 189 of FIG. 1).

According to various embodiments, various electronic components (e.g., at least some among the components included in the electronic device 101 of FIG. 1) such as the processor 120, the memory 130, the sensor module 176, the interface 177, and/or the wireless communication module 192 illustrated in FIG. 1 may be disposed on the first printed circuit board 251 and/or the second printed circuit board 261. The processor may include, for example, one or more of a central processing unit, an application processor, a graphic processing unit, an image signal processor, a sensor hub processor, or a communication processor. The first printed circuit board 251 and/or the second printed circuit board 261 may include, for example, a printed circuit board (PCB), a flexible PCB (FPCB), or a rigid-flexible PCB (RFPCB). In some embodiments, the first printed circuit board 251 and/or the second printed circuit board 261 may include a main PCB, a slave PCB disposed to partially overlap the main PCB, and/or an interposer substrate between the main PCB and the slave PCB. The first printed circuit board 251 and/or the second printed circuit board 261 may be electrically connected to other components (e.g., the camera module 203, the first gaze tracking camera 205, the second gaze tracking camera 207, the audio module 209, the first microphone 211, the first recognition camera 213, the first light-emitting device 217, the first display module 219, the second microphone 221, the second recognition camera 223, the second light-emitting device 227, the second display module 229, the first sound output module 253, and/or the second sound output module 263) by using an electrical path such as a FPCB and/or a cable. For example, the FPCB and/or the cable may be disposed in at least a portion of the first rim 210, the bridge 201, and/or the second rim 220. In some embodiments, the wearable electronic device 200 may include only one of the first printed circuit board 251 or the second printed circuit board 261.

According to various embodiments, the first sound output module 253 and/or the second sound output module 263 may transmit an audio signal to the left ear and/or the right ear of the user. The first sound output module 253 and/or the second sound output module 263 may include, for example, a piezo speaker (e.g., a bone conduction speaker) which transmits an audio signal without a speaker hole. In some embodiments, the wearable electronic device 200 may include only one of the first sound output module 253 or the second sound output module 263.

According to various embodiments, the first battery 257 and/or the second battery 267 may supply power to the first printed circuit board 251 and/or the second printed circuit board 261 by using a power management module (e.g., the power management module 188 of FIG. 1). The first battery 257 and/or the second battery 267 may include, for example, a non-rechargeable primary battery, a rechargeable secondary battery, or a fuel cell. In some embodiments, the wearable electronic device 200 may include only one of the first battery 257 or the second battery 267.

According to various embodiments, the wearable electronic device 200 may include a sensor module (e.g., the sensor module 176 of FIG. 1). The sensor module may generate an electrical signal or a data value corresponding to an internal operating state of the wearable electronic device 200 or an external environment state. The sensor module may include, for example, at least one of a gesture sensor, a gyro sensor, an air pressure sensor, a magnetic sensor, an acceleration sensor, a grip sensor, a color sensor, an infrared (IR) sensor, a biometric sensor (e.g., an HRM sensor), a temperature sensor, a humidity sensor, an inertial measurement (IMU) sensor, or an illuminance sensor. In some embodiments, the sensor module may recognize biometric information of the user by using various biosensors (or biometric sensors) such as an olfactory sensor (e-nose sensor), an electromyography sensor (EMG sensor), an electroencephalogram sensor (EEG sensor), an electrocardiogram sensor (ECG sensor), or an iris sensor.

According to various embodiments, the wearable electronic device 200 may display a virtual object through the first glass 215 and the second glass 225 to implement augmented reality and/or virtual reality.

Figure 3:
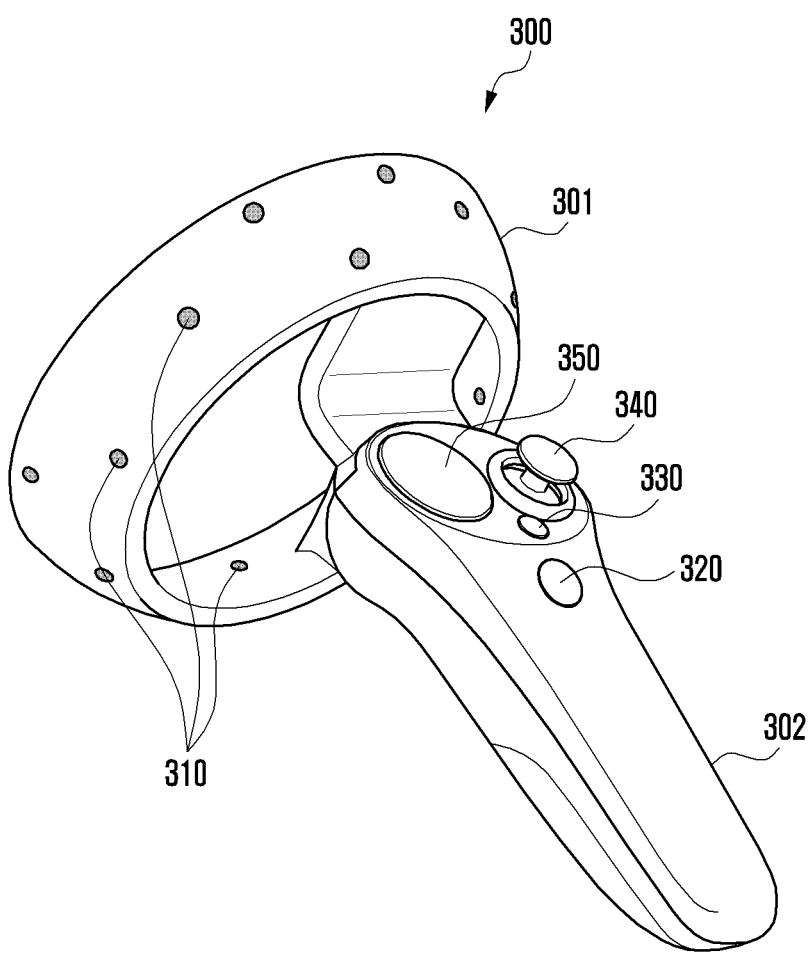
FIG. 3 is a perspective view schematically illustrating a controller associated with a wearable electronic device according to an embodiment of the disclosure.
Figure 4:
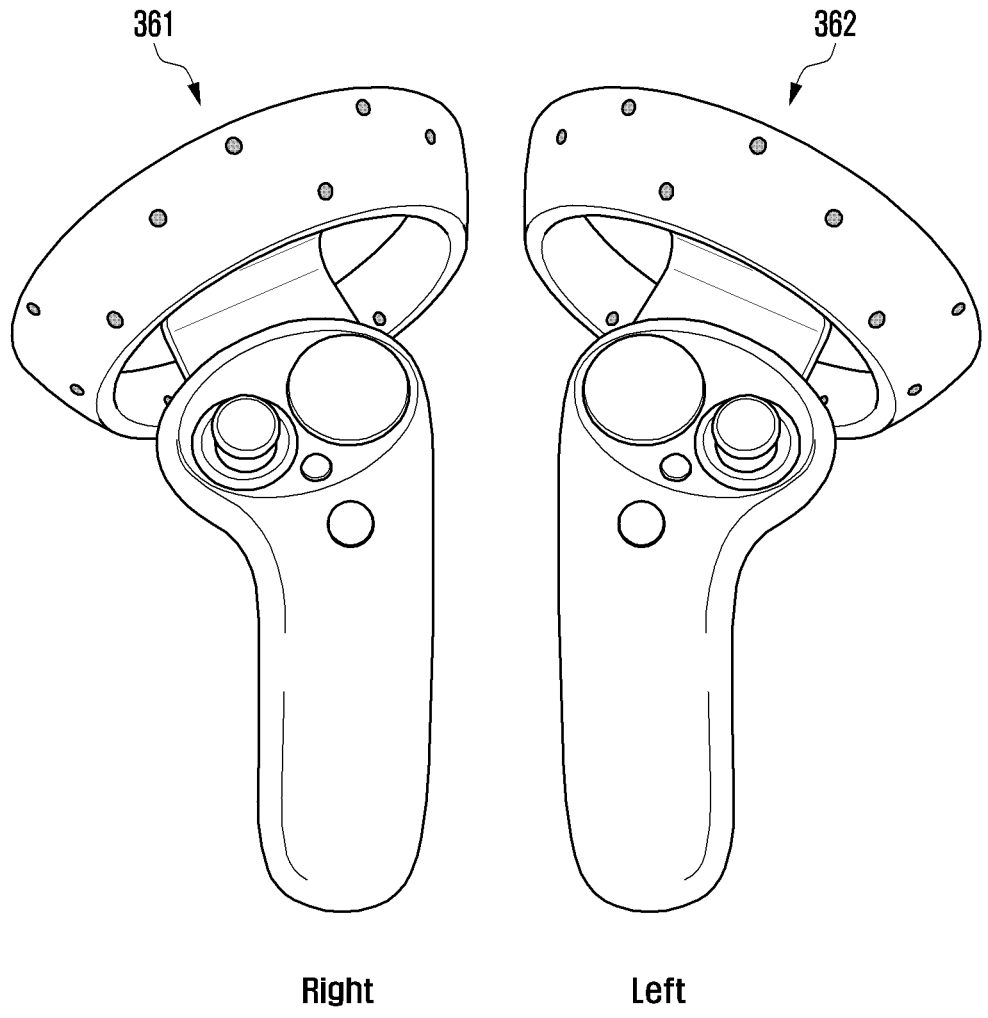
FIG. 4 is a perspective view schematically illustrating a pair of controllers associated with a wearable electronic device according to an embodiment of the disclosure.

FIG. 3 is a perspective view schematically illustrating a controller associated with a wearable electronic device according to an embodiment of the disclosure. FIG. 4 is a perspective view schematically illustrating a pair of controllers associated with a wearable electronic device according to an embodiment of the disclosure.

According to an embodiment, a controller 300 may include the processor 120, the memory 130, the program 140, the input module 150, the sound output module 155, the sensor module 176, the battery 189, and/or the wireless communication module 192 of the electronic device 101 illustrated in FIG. 1.

According to an embodiment, the controller 300 may operate in association with the wearable electronic device 200. The controller 300 may transmit or receive a signal to or from the wearable electronic device 200 via wireless communication. The wireless communication may include one of WiFi, Bluetooth, or mmWave. The controller 300 may transmit a key input signal and motion data to the wearable electronic device 200. The controller 300 may receive a control signal from the wearable electronic device 200.

According to an embodiment, the controller 300 may play (or control) a game through a game screen displayed through the first glass 215 (e.g., a first display) and the second glass 225 (e.g., a second display) of the wearable electronic device 200. The wearable electronic device 200 may differently configure game screens displayed through the first glass 215 and the second glass 225, based on a control operation of the controller 300. The controller 300 may be a handler capable of controlling a game screen of the wearable electronic device 200. The controller 300 may use a vision manner.

Referring to FIG. 3, the controller 300 according to an embodiment of the disclosure may include a first case 301 and a second case 302. The first case 301 and the second case 302 may be integrally connected.

According to an embodiment, the first case 301 may include an LED 310. At least one LED 310 may be disposed in the first case 301. A plurality of LEDs 310 may be disposed in the first case 301. The LEDs 310 may be disposed in the first case 301 to be detected through the first recognition camera 213 and/or the second recognition camera 223 of the wearable electronic device 200. For example, a portion of the LEDs 310 may be disposed on the outer surface of the first case 301 and other portions thereof may be disposed on the inner surface of the first case 301. The LEDs 310 may be turned on or off in a designated pattern. The LEDs 310 may be repeatedly turned on and turned off at a predetermined period to reduce current consumption. Turn-on and turn-off times of the LEDs 310 may be changed.

According to an embodiment, the second case 302 may include an on/off button 320, a menu button 330, a joystick 340, and/or a touch pad 350. The on/off button 320 may turn on or off the controller 300. The menu button 330 may be used when bringing up a menu displayed through the first glass 215 (e.g., a first display) and the second glass 225 (e.g., a second display) of the wearable electronic device 200. The joystick 340 may be used when performing an operation (e.g., movement and rotation) of a game displayed through the first glass 215 and the second glass 225 of the wearable electronic device 200. The touch pad 350 may be used when inputting an operation signal necessary for playing a game displayed through the first glass 215 and the second glass 225 of the wearable electronic device 200. In various embodiments, the configurations included in the second case 302 are not limited to the above-described examples, and various other configurations may be included.

According to various embodiments, the controller 300 may have a printed circuit board (not shown) disposed inside the second case 302. Electronic components which perform substantially the same function as that of the processor 120, the memory 130, the input module 150, the sound output module 155, the sensor module 176, the battery 189, or the wireless communication module 192 of the electronic device 101 illustrated in FIG. 1 may be disposed on the printed circuit board of the controller 300.

Referring to FIG. 4, the controller 300 associated with the wearable electronic device 200 may include a controller 361 capable of being manipulated by a user by using a right hand, and a controller 362 capable of being manipulated by a user by using a left hand.

According to an embodiment, each of the controller 361 capable of being manipulated by a user by using a right hand and the controller 362 capable of being manipulated by a user by using a left hand may include substantially the same embodiments described in the controller 300 illustrated in FIG. 3. The wearable electronic device 200 may perform an operation in association with at least one of the controllers 361 and 362.

Figure 5:
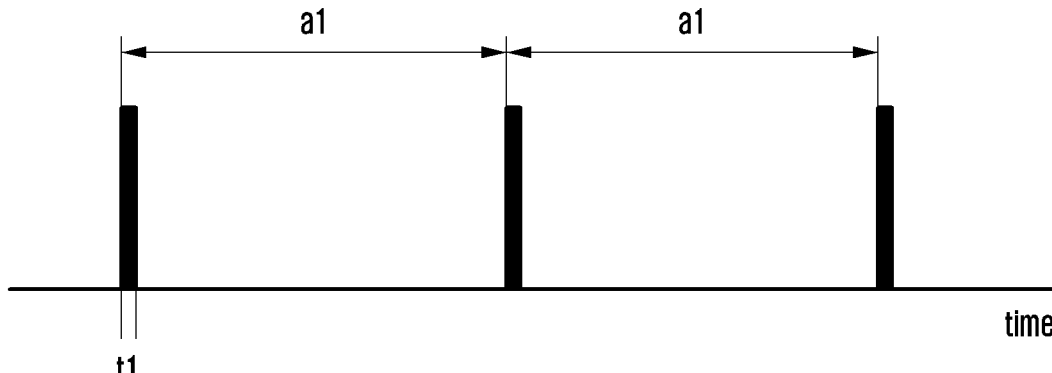
FIG. 5 schematically illustrates a turn-on time and a light emission period of an LED for one controller associated with a wearable electronic device according to an embodiment of the disclosure.

FIG. 5 schematically illustrates a turn-on time and a light emission period of an LED for one controller associated with a wearable electronic device according to an embodiment of the disclosure.

Referring to FIG. 5, an LED 310 disposed in the controller 300 may be repeatedly turned on and off at a predetermined period to reduce current consumption. The LED 310 may be operated at substantially the same light emission period (e.g., a1). For example, the LED 310 may be operated at a light emission period of about 33 ms. The LED 310 may be repeatedly turned on and off at substantially the same time interval (e.g., t1). For example, the LED 310 may be repeatedly turned on and off at a time interval of about 20 μs.

Figure 6:
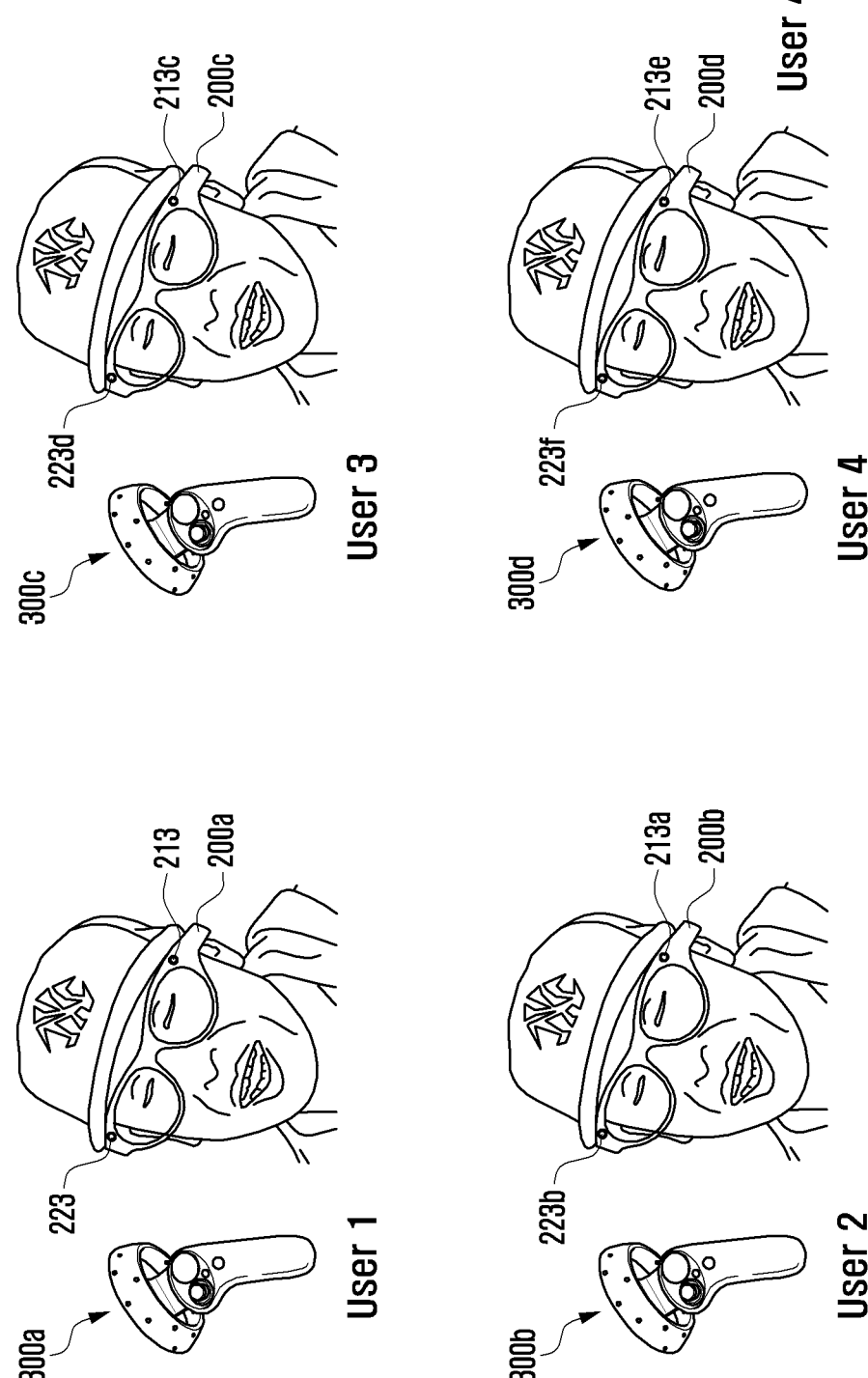
FIG. 6 schematically illustrates an embodiment in which a wearable electronic device may recognize a plurality of controllers according to an embodiment of the disclosure.

FIG. 6 schematically illustrates an embodiment in which a wearable electronic device may recognize a plurality of controllers according to an embodiment of the disclosure.

Referring to FIG. 6, user 1 may use a first wearable electronic device 200a associated with a first controller 300a. User 2 may use a second wearable electronic device 200b associated with a second controller 300b. User 3 may use a third wearable electronic device 200c associated with a third controller 300c. User 4 may use a fourth wearable electronic device 200d associated with a fourth controller 300d.

In various embodiments, when user 5 exists, the user 5 may use, for example, a fifth wearable electronic device (not shown) associated with a fifth controller (not shown). The user 1 to user 5 are examples, and there may be more or fewer users.

According to an embodiment, the first wearable electronic device 200a, the second wearable electronic device 200b, the third wearable electronic device 200c, or the fourth wearable electronic device 200*d* may include configurations substantially the same as at least some of the embodiments described in the electronic device 101 illustrated in FIG. 1. The first wearable electronic device 200*a*, the second wearable electronic device 200*b*, the third wearable electronic device 200*c*, or the fourth wearable electronic device 200*d* may include configurations substantially the same as at least some of the embodiments described in the wearable electronic device 200 illustrated in FIG. 2. In an embodiment, the first wearable electronic device 200*a* may be the electronic device 101 illustrated in FIG. 1. In an embodiment, the second wearable electronic device 200*b*, the third wearable electronic device 200*c*, or the fourth wearable electronic device 200*d* may be the external electronic device 102 or 104 illustrated in FIG. 1. In the description of FIG. 6, components substantially the same as those of the embodiment of the electronic device 101 of FIG. 1 or the embodiment of the wearable electronic device 200 of FIG. 2 are given similar reference numerals, and redundant descriptions will be omitted. According to various embodiments, the first wearable electronic device 200*a*, the second wearable electronic device 200*b*, the third wearable electronic device 200*c*, and/or the fourth wearable electronic device 200*d* described below may perform substantially the same function, differing only in the mark thereof.

According to an embodiment, the first wearable electronic device 200*a* used by the user 1 may serve as a server. For example, the first wearable electronic device 200*a* may serve as a host of the second wearable electronic device 200*b*, the third wearable electronic device 200*c*, and/or the fourth wearable electronic device 200*d*. The first wearable electronic device 200*a* may transmit a control signal to the first controller 300*a*, the second wearable electronic device 200*b*, the second controller 300*b*, the third wearable electronic device 200*c*, the third controller 300*c*, the fourth wearable electronic device 200*d*, and/or the fourth controller 300*d*. For example, a control signal transmitted from the first wearable electronic device 200*a* may include a signal which controls a turn-on time and a light emission period of an LED 310 disposed in each of the first controller 300*a*, the second controller 300*b*, the third controller 300*c*, and the fourth controller 300*d*. The first wearable electronic device 200*a* may control turn-on times and operation periods of the first recognition camera 213 and the second recognition camera 223, based on a turn-on time and a light emission period of the LED 310 disposed in each of the first controller 300*a*, the second controller 300*b*, the third controller 300*c*, and the fourth controller 300*d*. In an embodiment, a timing at which a third recognition camera 213*a* and a fourth recognition camera 223*b* of the second wearable electronic device 200*b* are operated, a timing at which a fifth recognition camera 213*c* and a sixth recognition camera 223*d* of the third wearable electronic device 200*c* are operated, and/or a timing at which a seventh recognition camera 213*e* and an eighth recognition camera 223*f* of the fourth wearable electronic device 200*d* are operated may be controlled by using the control signal transmitted from the first wearable electronic device 200*a*. In an embodiment, the first wearable electronic device 200*a* may receive information transmitted from the second wearable electronic device 200*b*, the third wearable electronic device 200*c*, and/or the fourth wearable electronic device 200*d*.

According to various embodiments, the LED 310 disposed in each of the first controller 300*a*, the second controller 300*b*, the third controller 300*c*, and the fourth controller 300*d* may perform an operation based on the control signal transmitted from the first wearable electronic device 200*a*. The third recognition camera 213*a* and the fourth recognition camera 223*b* of the second wearable electronic device 200*b*, the fifth recognition camera 213*c* and the sixth recognition camera 223*d* of the third wearable electronic device 200*c*, the seventh recognition camera 213*e* and/or the eighth recognition camera 223*f* of the fourth wearable electronic device 200*d* may perform an operation based on the control signal transmitted from the first wearable electronic device 200*a*.

According to an embodiment, the first wearable electronic device 200*a* (e.g., the wearable electronic device 200 of FIG. 2) may detect movements and positions of the first controller 300*a*, the second controller 300*b*, the third controller 300*c*, and/or the fourth controller 300*d* through at least one of the first recognition camera 213 and the second recognition camera 223.

According to an embodiment, the first wearable electronic device 200*a* may detect turn-on and/or turn-off of the LED 310 disposed in each of the first controller 300*a*, the second controller 300*b*, the third controller 300*c*, and/or the fourth controller 300*d*, through the first recognition camera 213 and/or the second recognition camera 223, and identify positions of the first controller 300*a*, the second controller 300*b*, the third controller 300*c*, and/or the fourth controller 300*d*. In various embodiments, each of the first controller 300*a*, the second controller 300*b*, the third controller 300*c*, and/or the fourth controller 300*d* may include an inertial measurement sensor, and transmit angular velocity and acceleration of the first controller 300*a*, the second controller 300*b*, the third controller 300*c*, and/or the fourth controller 300*d* to the first wearable electronic device 200*a*. In various embodiments, the first controller 300*a*, the second controller 300*b*, the third controller 300*c*, and/or the fourth controller 300*d* may include the sensor module 176 illustrated in FIG. 1.

According to an embodiment, the first wearable electronic device 200*a* may identify a movement and a position of the first controller 300*a* through the first recognition camera 213 and/or the second recognition camera 223. The first wearable electronic device 200*a* may receive information related to a movement and a position of the second controller 300*b* through the second wearable electronic device 200*b*. The first wearable electronic device 200*a* may receive information related to a movement and a position of the third controller 300*c* through the third wearable electronic device 200*c*. The first wearable electronic device 200*a* may receive information related to a movement and a position of the fourth controller 300*d* through the fourth wearable electronic device 200*d*. According to an embodiment, the first wearable electronic device 200*a* may detect movements and positions of the first controller 300*a*, the second controller 300*b*, the third controller 300*c*, and/or the fourth controller 300*d* through a sensor module (e.g., the sensor module 176 of FIG. 1). For example, the sensor module 176 of the first wearable electronic device 200*a* may include an inertial measurement sensor configured to measure angular velocity and acceleration of the first controller 300*a*, the second controller 300*b*, the third controller 300*c*, and/or the fourth controller 300*d*.

According to various embodiments, each of the first controller 300*a*, the second controller 300*b*, the third controller 300*c*, and the fourth controller 300*d* may include an inertial measurement sensor, and the measured information may be transmitted to at least one of the first wearable electronic device 200*a* to the fourth wearable electronic device 200*d*.

According to an embodiment, the sensor module 176 of the first wearable electronic device 200a may include a global positioning system (GPS) sensor configured to detect positions of the first controller 300a, the second controller 300b, the third controller 300c, and/or the fourth controller 300d.

According to various embodiments, each of the first controller 300a, the second controller 300b, the third controller 300c, and the fourth controller 300d may include a GPS sensor, and the measured information may be transmitted to at least one of the first wearable electronic device 200a to the fourth wearable electronic device 200d.

According to an embodiment, the first wearable electronic device 200a may detect at least one of a light emission period, a turn-on time (e.g., a light emission timing), and a light emission pattern of the LED 310 disposed in each of the first controller 300a, the second controller 300b, the third controller 300c, and/or the fourth controller 300d, through the first recognition camera 213 and/or the second recognition camera 223. The first wearable electronic device 200a may detect a light emission period, a turn-on time, and/or a light emission pattern of the LED 310 disposed in each of the first controller 300a, the second controller 300b, the third controller 300c, and/or the fourth controller 300d, through the first recognition camera 213 and/or the second recognition camera 223, and identify the first controller 300a, the second controller 300b, the third controller 300c, and/or the fourth controller 300d.

According to an embodiment, the first wearable electronic device 200a may receive designated information (e.g., movement and position signals) from the second wearable electronic device 200b, the third wearable electronic device 200c, and/or the fourth wearable electronic device 200d.

The first wearable electronic device 200a may render the information received from the second wearable electronic device 200b, the third wearable electronic device 200c, and/or the fourth wearable electronic device 200d, and then transmit vision data, audio data, and/or a control signal to the second wearable electronic device 200b, the third wearable electronic device 200c, and/or the fourth wearable electronic device 200d.

According to an embodiment, the first recognition camera 213 and/or the second recognition camera 223 may recognize a peripheral space of the first wearable electronic device 200a. The first recognition camera 213 and/or the second recognition camera 223 may detect movements and positions of the first controller 300a, the second controller 300b, the third controller 300c, and/or the fourth controller 300d within a predetermined distance (e.g., a predetermined space) of the first wearable electronic device 200a. The first recognition camera 213 and/or the second recognition camera 223 may include a global shutter (GS) camera through which a rolling shutter (RS) phenomenon may be reduced, in order to detect a light emission period, a timing of a light emission time, and a light emission pattern of the LED 310 disposed in each of the first controller 300a, the second controller 300b, the third controller 300c, and/or the fourth controller 300d.

According to an embodiment, the LED 310 disposed in each of the first controller 300a, the second controller 300b, the third controller 300c, and the fourth controller 300d may be turned on or off to have a different pattern. At least one of the first recognition camera 213 and the second recognition camera 223 of the first wearable electronic device 200a may identify the first controller 300a, the second controller 300b, the third controller 300c, and/or the fourth controller 300d, based on at least one of a light emission period, a turn-on time (e.g., a light emission timing), and a light emission pattern of the LED 310 disposed in each of the first controller 300a, the second controller 300b, the third controller 300c, and the fourth controller 300d.

According to an embodiment, while a game is being executed by the first wearable electronic device 200a by using the first controller 300a, when the second controller 300b associated with the second wearable electronic device 200b, the third controller 300c associated with the third wearable electronic device 200c, and/or the fourth controller 300d associated with the fourth wearable electronic device 200d are positioned adjacent to the first wearable electronic device 200a, the first wearable electronic device 200a may recognize the second controller 300b, the third controller 300c, and/or the fourth controller 300d through at least one of the first recognition camera 213 or the second recognition camera 223, and transmit a control signal, which causes the LED disposed in each of the second controller, the third controller, and/or the fourth controller to be operated to have a different turn-on time and a different light emission pattern from the LED 310 disposed in the first controller 300a, to the second controller 300b, the third controller 300c, and/or the fourth controller 300d.

According to an embodiment, although, in the above-described embodiment, an embodiment in which the first wearable electronic device 200a operates as a host has been described, the second wearable electronic device 200b, the third wearable electronic device 200c, or the fourth wearable electronic device 200d may perform an operation as a host, and perform substantially the same function as that of the above-described first wearable electronic device 200a.

According to various embodiments, the electronic device 101 (e.g., a mobile terminal) illustrated in FIG. 1 may transmit a control signal (e.g., operation information) to the first controller 300a, the second controller 300b, the third controller 300c, and the fourth controller 300d through the first wearable electronic device 200a, the second wearable electronic device 200b, the third wearable electronic device 200c, and the fourth wearable electronic device 200d.

Cases (a) to (d) of FIG. 7 illustrate an embodiment in which a wearable electronic device identifies at least one controller according to an embodiment of the disclosure.

According to an embodiment, case (a) of FIG. 7 may illustrate a turn-on time and a light emission period of the LED 310 of the first controller 300a associated with the first wearable electronic device 200a. Case (b) of FIG. 7 may illustrate a turn-on time and a light emission period of the LED 310 of the first controller 300a associated with the first wearable electronic device 200a, and a turn-on time and a light emission period of the LED 310 of the second controller 300b associated with the second wearable electronic device 200b. Case (c) of FIG. 7 may illustrate a turn-on time and a light emission period of the LED 310 of the first controller 300a associated with the first wearable electronic device 200a, a turn-on time and a light emission period of the LED 310 of the second controller 300b associated with the second wearable electronic device 200b, and a turn-on time and a light emission period of the LED 310 of the third controller 300c associated with the third wearable electronic device 200c. Case (d) of FIG. 7 may illustrate a turn-on time and a light emission period of the LED 310 of the first controller 300a associated with the first wearable electronic device 200a, a turn-on time and a light emission period of the LED 310 of the second controller 300b associated with the second wearable electronic device 200b, a turn-on time and a light emission period of the LED 310 of the third controller 300c associated with the third wearable electronic device 200c, and a turn-on time and a light emission period of the LED 310 of the fourth controller 300d associated with the fourth wearable electronic device 200d.

Referring to case (a) of FIG. 7, the first wearable electronic device 200a may configure a first turn-on time (1) and a light emission period a1 of the LED 310 disposed in the first controller 300a, and transmit the same to the first controller 300a. The first wearable electronic device 200a may identify the first controller 300a in which the LED 310 is operated over the first turn-on time (1), by using at least one of the first recognition camera 213 or the second recognition camera 223.

Referring to case (b) of FIG. 7, the first wearable electronic device 200a may configure a first turn-on time (1) and a light emission period a1 of the LED 310 disposed in the first controller 300a, and transmit the same to the first controller 300a. The first wearable electronic device 200a may configure a second turn-on time (2) and a light emission period of the LED 310 disposed in the second controller 300b, and transmit the same to the second controller 300b through the second wearable electronic device 200b. The first wearable electronic device 200a may identify the first controller 300a in which the LED 310 is operated over the first turn-on time (1), and/or the second controller 300b in which the LED 310 is operated over the second turn-on time (2), by using at least one of the first recognition camera 213 or the second recognition camera 223. In an embodiment, the light emission period of the LED 310 disposed in the first controller 300a and the light emission period of the LED 310 disposed in the second controller 300b may be substantially the same, and the first turn-on time (1) of the LED 310 disposed in the first controller 300a and the second turn-on time (2) of the LED 310 disposed in the second controller 300b may be different from each other. For example, timings of the first turn-on time (1) and the second turn-on time (2) may be different from each other.

Referring to case (c) of FIG. 7, the first wearable electronic device 200a may configure a first turn-on time (1) and a light emission period a1 of the LED 310 disposed in the first controller 300a, and transmit the same to the first controller 300a. The first wearable electronic device 200a may configure a second turn-on time (2) and a light emission period of the LED 310 disposed in the second controller 300b, and transmit the same to the second controller 300b through the second wearable electronic device 200b. The first wearable electronic device 200a may configure a third turn-on time (3) and a light emission period of the LED 310 disposed in the third controller 300c, and transmit the same to the third controller 300c through the third wearable electronic device 200c. The first wearable electronic device 200a may identify the first controller 300a in which the LED 310 is operated over the first turn-on time (1), the second controller 300b in which the LED 310 is operated over the second turn-on time (2), and/or the third controller 300c in which the LED 310 is operated over the third turn-on time (3), by using at least one of the first recognition camera 213 or the second recognition camera 223. In an embodiment, the light emission period of the LED 310 disposed in the first controller 300a, the light emission period of the LED 310 disposed in the second controller 300b, and the light emission period of the LED 310 disposed in the third controller 300c may be substantially the same, and the first turn-on time (1) of the LED 310 disposed in the first controller 300a, the second turn-on time (2) of the LED 310 disposed in the second controller 300b, and the third turn-on time (3) of the LED 310 disposed in the third controller 300c may be different from each other. For example, timings of the first turn-on time (1), the second turn-on time (2), and the third turn-on time (3) may be different from each other.

Referring to case (d) of FIG. 7, the first wearable electronic device 200a may configure a first turn-on time (1) and a light emission period a1 of the LED 310 disposed in the first controller 300a, and transmit the same to the first controller 300a. The first wearable electronic device 200a may configure a second turn-on time (2) and a light emission period of the LED 310 disposed in the second controller 300b, and transmit the same to the second controller 300b through the second wearable electronic device 200b. The first wearable electronic device 200a may configure a third turn-on time (3) and a light emission period of the LED 310 disposed in the third controller 300c, and transmit the same to the third controller 300c through the third wearable electronic device 200c. The first wearable electronic device 200a may configure a fourth turn-on time (4) and a light emission period of the LED 310 disposed in the fourth controller 300d, and transmit the same to the fourth controller 300d through the fourth wearable electronic device 200d. The first wearable electronic device 200a may identify the first controller 300a in which the LED 310 is operated over the first turn-on time (1), the second controller 300b in which the LED 310 is operated over the second turn-on time (2), the third controller 300c in which the LED 310 is operated over the third turn-on time (3), and/or the fourth controller 300d in which the LED 310 is operated over the fourth turn-on time (4), by using at least one of the first recognition camera 213 or the second recognition camera 223. In an embodiment, the light emission period of the LED 310 disposed in the first controller 300a, the light emission period of the LED 310 disposed in the second controller 300b, the light emission period of the LED 310 disposed in the third controller 300c, and the light emission period of the LED 310 disposed in the fourth controller 300d may be substantially the same, and the first turn-on time (1) of the LED 310 disposed in the first controller 300a, the second turn-on time (2) of the LED 310 disposed in the second controller 300b, the third turn-on time (3) of the LED 310 disposed in the third controller 300c, and the fourth turn-on time (4) of the LED 310 disposed in the fourth controller 300d may be different from each other. For example, timings of the first turn-on time (1), the second turn-on time (2), the third turn-on time and the fourth turn-on time (4) may be different from each other. For example, the LED 310 disposed in each of the first controller 300a, the second controller 300b, the third controller 300c, and the fourth controller 300d may be turned on with a time difference.

Referring to cases (a) to (d) of FIG. 7, the first wearable electronic device 200a may transmit a control signal which causes the LED 310 disposed in the first controller 300a to be turned on at a designated time, according to the control of the processor 120. The first wearable electronic device 200a may transmit a control signal which causes the LED 310 disposed in the second controller 300b to be turned on at a designated time to the second controller 300b through the second wearable electronic device 200b, according to the control of the processor 120. The first wearable electronic device 200a may transmit a control signal which causes the LED 310 disposed in the third controller 300c to be turned on at a designated time to the third controller 300c through the third wearable electronic device 200c, according to the control of the processor 120. The first wearable electronic device 200a may transmit a control signal which causes the LED 310 disposed in the fourth controller 300d to be turned on at a designated time to the fourth controller 300d through the fourth wearable electronic device 200d, according to the control of the processor 120. The LED 310 disposed in each of the first controller 300*a*, the second controller 300*b*, the third controller 300*c*, and the fourth controller 300*d* is operated at substantially the same light emission period a1 (e.g., about 33 ms), and timings of the first turn-on time ① to the fourth turn-on time ④ may be different from each other. In an embodiment, according to the control of the processor 120, the first wearable electronic device 200*a* may transmit, through the wireless communication module 192, a control signal, which causes the LED 310 disposed in each of the first controller, the second controller, the third controller, and the fourth controller to be operated at substantially the same light emission period and at different turn-on times (e.g., the first turn-on time ① to the fourth turn-on time ④), to the first controller 300*a*, the second controller 300*b*, the third controller 300*c*, and the fourth controller 300*d*. The first wearable electronic device 200*a* may identify the first controller 300*a*, the second controller 300*b*, the third controller 300*c*, and the fourth controller 300*d* which have the respective LEDs 310 having different turn-on timings, by using at least one of the first recognition camera 213 or the second recognition camera 223.

According to an embodiment, the first wearable electronic device 200*a* may identify light emission intensity and/or color information of the LED 310 disposed in each of the first controller 300*a*, the second controller 300*b*, the third controller 300*c*, and the fourth controller 300*d*, through at least one of the first recognition camera 213 or the second recognition camera 223, and identify each of the first controller 300*a*, the second controller 300*b*, the third controller 300*c*, and the fourth controller 300*d*.

Cases (a) to (d) of FIG. 8 illustrate an embodiment of an operation time configuration when at least one of a first recognition camera or a second recognition camera of a wearable electronic device detects an LED disposed in at least one controller according to an embodiment of the disclosure.

According to an embodiment, case (a) of FIG. 8 may illustrate an operation time of at least one of the first recognition camera 213 or the second recognition camera 223 when recognizing a first turn-on time ① of the LED 310 of the first controller 300*a* associated with the first wearable electronic device 200*a*. Case (b) of FIG. 8 may illustrate an operation time of at least one of the first recognition camera 213 or the second recognition camera 223 of the first wearable electronic device 200*a* and an operation time of at least one of the third recognition camera 213*a* or the fourth recognition camera 223*b* of the second wearable electronic device 200*b* when recognizing a first turn-on time ① of the LED 310 of the first controller 300*a* associated with the first wearable electronic device 200*a* and a second turn-on time ② of the LED 310 of the second controller 300*b* associated with the second wearable electronic device 200*b*. Case (c) of FIG. 8 may illustrate an operation time of at least one of the first recognition camera 213 or the second recognition camera 223 of the first wearable electronic device 200*a*, an operation time of at least one of the third recognition camera 213*a* or the fourth recognition camera 223*b* of the second wearable electronic device 200*b*, and an operation time of at least one of the fifth recognition camera 213*c* or the sixth recognition camera 223*d* of the third wearable electronic device 200*c* when recognizing a first turn-on time ① of the LED 310 of the first controller 300*a* associated with the first wearable electronic device 200*a*, a second turn-on time ② of the LED 310 of the second controller 300*b* associated with the second wearable electronic device 200*b*, and a third turn-on time ③ of the LED 310 of the third controller 300*c* associated with the third wearable electronic device 200*c*. Case (d) of FIG. 8 may illustrate an operation time of at least one of the first recognition camera 213 or the second recognition camera 223 of the first wearable electronic device 200*a*, an operation time of at least one of the third recognition camera 213*a* or the fourth recognition camera 223*b* of the second wearable electronic device 200*b*, an operation time of at least one of the fifth recognition camera 213*c* or the sixth recognition camera 223*d* of the third wearable electronic device 200*c*, and an operation time of at least one of the seventh recognition camera 213*e* or the eighth recognition camera 223*f* of the fourth wearable electronic device 200*d* when recognizing a first turn-on time ① of the LED 310 of the first controller 300*a* associated with the first wearable electronic device 200*a*, a second turn-on time ② of the LED 310 of the second controller 300*b* associated with the second wearable electronic device 200*b*, a third turn-on time ③ of the LED 310 of the third controller 300*c* associated with the third wearable electronic device 200*c*, and a fourth turn-on time ④ of the LED 310 of the fourth controller 300*d* associated with the fourth wearable electronic device 200*d*.

According to various embodiments, the first wearable electronic device 200*a* may obtain a light emission period, a timing of a turn-on time, and/or a light emission pattern of the LED 310 disposed in the first controller 300*a* through at least one of the first recognition camera 213 or the second recognition camera 223. The second wearable electronic device 200*b* may obtain a light emission period, a timing of a turn-on time, and/or a light emission pattern of the LED 310 disposed in the second controller 300*b* through at least one of the third recognition camera 213*a* or the fourth recognition camera 223*b*. The third wearable electronic device 200*c* may obtain a light emission period, a timing of a turn-on time, and/or a light emission pattern of the LED 310 disposed in the third controller 300*c* through at least one of the fifth recognition camera 213*c* or the sixth recognition camera 223*d*. The fourth wearable electronic device 200*d* may obtain a light emission period, a timing of a turn-on time, and/or a light emission pattern of the LED 310 disposed in the fourth controller 300*d* through the seventh recognition camera 213*e* or the eighth recognition camera 223*f*.

According to various embodiments, the first wearable electronic device 200*a* to the fourth wearable electronic device 200*d* may share a light emission period, a timing of a turn-on time, and/or a light emission pattern of the LED 310 obtained from each of the first controller 300*a* to the fourth controller 300*d*. For example, information related to the light emission period, timing of a turn-on time, and/or light emission pattern of the LED 310 obtained from each of the second controller 300*b* to the fourth controller 300*d* may be transmitted to the first wearable electronic device 200*a* through each of the second wearable electronic device 200*b* to the fourth wearable electronic device 200*d*. Referring to case (a) of FIG. 8, the first wearable electronic device 200*a* may configure at least one of the first recognition camera 213 or the second recognition camera 223 to be operated over a fifth turn-on time ⑤, when recognizing the first turn-on time ① of the LED 310 disposed in the first controller 300*a* through at least one of the first recognition camera 213 or the second recognition camera 223. The fifth turn-on time ⑤ of at least one of the first recognition camera 213 or the second recognition camera 223 may be configured to be longer than the first turn-on time ① of the LED 310 disposed in the first controller 300*a*.

Referring to case (b) of FIG. 8, the first wearable electronic device 200*a* may configure at least one of the first recognition camera 213 or the second recognition camera 223 to be operated over a sixth turn-on time ⑥, when recognizing the second turn-on time ② of the LED 310 disposed in the second controller 300*b* through at least one of the first recognition camera 213 or the second recognition camera 223. The sixth turn-on time ⑥ of at least one of the first recognition camera 213 or the second recognition camera 223 may be configured to be longer than the second turn-on time ② of the LED 310 disposed in the second controller 300*b*.

Referring to case (c) of FIG. 8, the first wearable electronic device 200*a* may configure at least one of the first recognition camera 213 or the second recognition camera 223 to be operated over a seventh turn-on time ⑦, when recognizing the third turn-on time ③ of the LED 310 disposed in the third controller 300*c* through at least one of the first recognition camera 213 or the second recognition camera 223. The seventh turn-on time ⑦ of at least one of the first recognition camera 213 or the second recognition camera 223 may be configured to be longer than the third turn-on time ③ of the LED 310 disposed in the third controller 300*c*.

Referring to case (d) of FIG. 8, the first wearable electronic device 200*a* may configure at least one of the first recognition camera 213 or the second recognition camera 223 to be operated over an eighth turn-on time ⑧, when recognizing the fourth turn-on time ④ of the LED 310 disposed in the fourth controller 300*d* through at least one of the first recognition camera 213 or the second recognition camera 223. The eighth turn-on time ⑧ of at least one of the first recognition camera 213 or the second recognition camera 223 may be configured to be longer than the fourth turn-on time ④ of the LED 310 disposed in the fourth controller 300*d*.

According to an embodiment, the first wearable electronic device 200*a* may detect a light emission period, a timing of a turn-on time, and a light emission pattern of the LED 310 disposed in each of the first controller 300*a*, the second controller 300*b*, the third controller 300*c*, and the fourth controller 300*d*, through at least one of the first recognition camera 213 or the second recognition camera 223.

FIG. 9 illustrates an embodiment in which at least one of a first recognition camera or a second recognition camera of a wearable electronic device may detect a light emission pattern of an LED disposed in at least one controller according to an embodiment of the disclosure. FIG. 10 illustrates various embodiments in which at least one of a first recognition camera or a second recognition camera of a wearable electronic device may detect a light emission pattern of an LED disposed in at least one controller according to an embodiment of the disclosure.

According to an embodiment, FIGS. 9 and 10 may illustrate various embodiments in which the wearable electronic device 200 detects a first pattern (pattern 1) of an LED 310 disposed in a first controller to a fifth pattern (pattern 5) of an LED 310 disposed in a fifth controller by using at least one of the first recognition camera 213 or the second recognition camera 223. Each of the first controller to the fifth controller described with reference to FIGS. 9 and 10 may have substantially the same configuration as that of the controller 300 illustrated in FIG. 3.

Referring to FIG. 9, a first column 910 may indicate a case in which the LED 310 disposed in the first controller to the LED 310 disposed in the fifth controller are in an on state and an off state. For example, the first column 910 may illustrate all cases in which the LED 310 disposed in the first controller to the LED 310 disposed in the fifth controller are in a light-emitting state or are not in the light-emitting state. A second column 920 of FIG. 2 may indicate a case in which the LED 310 disposed in the first controller to the LED 310 disposed in the fifth controller are in an on state. For example, the second column 920 may illustrate only a case in which the LED 310 disposed in the first controller to the LED 310 disposed in the fifth controller are in a light-emitting state.

According to an embodiment, each of the LED 310 disposed in the first controller to the LED 310 disposed in the fifth controller may include, for example, an array of first LEDs A and second LEDs B.

According to an embodiment, in a first pattern (pattern 1) of the LED 310 disposed in the first controller, the first LEDs A may be turned on, the second LEDs B may be turned off, the first LEDs A may be turned on, and the second LEDs B may be turned off.

According to an embodiment, in a second pattern (pattern 2) of the LED 310 disposed in the second controller, the first LEDs A may be turned off, the second LEDs B may be turned on, the first LEDs A may be turned off, and the second LEDs B may be turned on.

According to an embodiment, in a third pattern (pattern 3) of the LED 310 disposed in the third controller, the first LEDs A may be turned on, the second LEDs B may be turned on, the first LEDs A may be turned off, and the second LEDs B may be turned on.

According to an embodiment, in a fourth pattern (pattern 4) of the LED 310 disposed in the fourth controller, the first LEDs A may be turned off, the second LEDs B may be turned on, the first LEDs A may be turned on, and the second LEDs B may be turned off.

According to an embodiment, in a fifth pattern (pattern 5) of the LED 310 disposed in the fifth controller, the first LEDs A may be turned on, the second LEDs B may be turned off, the first LEDs A may be turned on, and the second LEDs B may be turned on.

According to various embodiments, the wearable electronic device 200 (e.g., the first wearable electronic device 200*a* of FIG. 6) may recognize the first pattern (pattern 1) of the first controller, the second pattern (pattern 2) of the second controller, the third pattern (pattern 3) of the third controller, the fourth pattern (pattern 4) of the fourth controller, and/or the fifth pattern (pattern 5) of the fifth controller by using at least one of the first recognition camera 213 or the second recognition camera 223, so as to identify the first controller to the fifth controller.

Referring to FIG. 10, the wearable electronic device 200 (e.g., the first wearable electronic device 200*a* of FIG. 6) may recognize and identify the first pattern (pattern 1) of the first controller to the fifth pattern (pattern 5) of the fifth controller by using at least one of the first recognition camera 213 or the second recognition camera 223.

According to an embodiment, the first controller may include the first pattern (pattern 1) having an array in which only the first LEDs A are turned on. The first pattern (pattern 1) may include an array in which the second LEDs B are turned off.

According to an embodiment, the second controller may include the second pattern (pattern 2) having an array in which only the second LEDs B are turned on. The second pattern (pattern 2) may include an array in which the first LEDs A are turned off. For example, the second controller may transmit information related to the second pattern (pattern 2) to the wearable electronic device 200 (e.g., the first wearable electronic device 200*a* of FIG. 6) through a second wearable electronic device (e.g., the second wearable electronic device 200*b* of FIG. 6).

According to an embodiment, the third pattern (pattern 3) of the third controller, the fourth pattern (pattern 4) of the fourth controller, and the fifth pattern (pattern 5) of the fifth controller may include a pattern in which some of the first LEDs A and some of the second LEDs B are turned on and/or off. For example, the third controller, the fourth controller, and the fifth controller may transmit information on the third pattern (pattern 3), the fourth pattern (pattern 4), and the fifth pattern (pattern 5) to the wearable electronic device 200 (e.g., the first wearable electronic device 200*a* of FIG. 6) through the respective wearable electronic devices corresponding thereto.

According to various embodiments, arrays of the first pattern (pattern 1) of the first controller to the fifth pattern (pattern 5) of the fifth controller are not limited to the above example, and may be changed to various other arrays.

FIG. 11A illustrates an embodiment in which an accessory includes a first pattern according to an embodiment of the disclosure. FIG. 11B illustrates an embodiment in which an accessory includes a second pattern according to an embodiment of the disclosure. FIG. 11C illustrates various embodiments of patterns which may be arranged on an accessory according to an embodiment of the disclosure.

Referring to FIG. 11A, the wearable electronic device 200 may recognize a first pattern 1110 of an LED 310 arranged on an accessory 1100 (e.g., a movable accessory device) by using at least one of the first recognition camera 213 or the second recognition camera 223.

Referring to FIG. 11B, the wearable electronic device 200 may recognize a second pattern 1120 of the LED 310 arranged on the accessory 1100 (e.g., a movable accessory device) by using at least one of the first recognition camera 213 or the second recognition camera 223.

Referring to FIG. 11C, the accessory 1100 (e.g., a movable device) may form various patterns by turning on and/or off a plurality of first LEDs A and a plurality of second LEDs B.

FIG. 12 is a flowchart illustrating a method for identifying, by a wearable electronic device, at least one controller by using at least one of a first recognition camera or a second recognition camera according to an embodiment of the disclosure.

In operation 1210, the processor 120 of the wearable electronic device 200 may identify that the first controller 300*a* and the second controller 300*b*, each of which has the LED 310 disposed therein, are detected within a designated space, through at least one of the first recognition camera 213 or the second recognition camera 223. In various embodiments, the processor 120 of the wearable electronic device 200 may identify that the first controller 300*a* and the second controller 300*b*, each of which has the LED 310 disposed therein, are detected within a designated space, through a sensor module (e.g., a proximity sensor) or wireless communication.

In operation 1220, the processor 120 may transmit, to the first controller 300*a*, a control signal which causes the LED 310 disposed in the first controller 300*a* to be operated at a first turn-on time ①.

In operation 1230, the processor 120 may transmit, to the second controller 300*b*, a control signal which causes the LED 310 disposed in the second controller 300*b* to be operated at a second turn-on time ②.

A wearable electronic device 200 or 200*a* according to an embodiment of the disclosure may include a wireless communication module 192, a sensor module 176, a first recognition camera 213 and/or a second recognition camera 223, and a processor 120 operatively connected with the wireless communication module 192, the sensor module 176, the first recognition camera 213, and/or the second recognition camera 223. According to an embodiment, the processor 120 may identify that a first controller 300*a* and a second controller 300*b*, each of which has an LED 310 disposed therein, are detected within a designated space, through at least one of the first recognition camera 213 and the second recognition camera 223. According to an embodiment, the processor 120 may transmit, to the first controller 300*a*, a control signal which causes the LED 310 disposed in the first controller 300*a* to be operated at a first turn-on time ①. According to an embodiment, the processor 120 may transmit, to the second controller 300*b*, a control signal which causes the LED 310 disposed in the second controller 300*b* to be operated at a second turn-on time ②.

According to an embodiment, the processor 120 may be configured to identify the first controller 300*a* and the second controller 300*b*, based on recognizing timings of the first turn-on time ① and the second turn-on time ② through at least one of the first recognition camera 213 and the second recognition camera 223.

According to an embodiment, the processor 120 may be configured to, when the first turn-on time ① is detected through at least one of the first recognition camera 213 and the second recognition camera 223, cause at least one of the first recognition camera 213 and the second recognition camera 223 to be operated over a fifth turn-on time ⑤ longer than the first turn-on time ①, and when the second turn-on time ② is detected through at least one of the first recognition camera 213 and the second recognition camera 223, cause at least one of the first recognition camera 213 and the second recognition camera 223 to be operated over a sixth turn-on time ⑥ longer than the second turn-on time ②.

According to an embodiment, the processor 120 may be configured to cause the LED 310 disposed in the first controller 300*a* and the LED 310 disposed in the second controller 300*b* to be operated at substantially the same light emission period.

According to an embodiment, the processor 120 may be configured to detect movements of the first controller 300*a* and the second controller 300*b* through at least one of the first recognition camera 213, the second recognition camera 223, and the sensor module 176.

According to an embodiment, the processor 120 may be configured to detect positions of the first controller 300*a* and the second controller 300*b* through at least one of the first recognition camera 213, the second recognition camera 223, and the sensor module 176.

According to an embodiment, the sensor module 176 may include an inertial measurement sensor configured to measure angular velocity and acceleration of the first controller 300*a* and the second controller 300*b*, or a global positioning system (GPS) sensor configured to detect positions of the first controller 300*a* and the second controller 300*b*.

According to an embodiment, the wearable electronic device 200 or 200*a* may be configured so that the LED 310 disposed in the first controller 300*a* is turned on and/or off to be operated in a first pattern, and the LED 310 disposed in the second controller 300*b* is turned on and/or off to be operated in a second pattern different from the first pattern.

According to an embodiment, the processor 120 may be configured to identify the first controller 300*a* and the second controller 300*b*, based on recognizing the first pattern of the LED 310 disposed in the first controller 300a and the second pattern of the LED 310 disposed in the second controller 300b through at least one of the first recognition camera 213 and the second recognition camera 223.

According to an embodiment, at least one of the first controller 300a and the second controller 300b may include a movable accessory device.

A method for identifying a first controller 300a and a second controller 300b by a wearable electronic device 200 or 200a according to an embodiment of the disclosure may include identifying, by a processor 120, that the first controller 300a and the second controller 300b, each of which has an LED 310 disposed therein, are detected within a designated space, through at least one of a first recognition camera 213 and a second recognition camera 223. According to an embodiment, the method may include transmitting, by the processor 120, to the first controller 300a, a control signal which causes the LED 310 disposed in the first controller 300a to be operated at a first turn-on time ①. According to an embodiment, the method may include transmitting, by the processor 120, to the second controller 300b, a control signal which causes the LED 310 disposed in the second controller 300b to be operated at a second turn-on time ②.

According to an embodiment, the method may include identifying the first controller 300a and the second controller 300b by the processor 120, based on recognizing timings of the first turn-on time ① and the second turn-on time ② through at least one of the first recognition camera 213 and the second recognition camera 223.

According to an embodiment, the method may include, when the first turn-on time ① is detected through at least one of the first recognition camera 213 and the second recognition camera 223, controlling, by the processor 120, at least one of the first recognition camera 213 and the second recognition camera 223 to be operated over a fifth turn-on time ⑤ longer than the first turn-on time ①, and when the second turn-on time ② is detected through at least one of the first recognition camera 213 and the second recognition camera 223, controlling, by the processor 120, at least one of the first recognition camera 213 and the second recognition camera 223 to be operated over a sixth turn-on time ⑥ longer than the second turn-on time ②.

According to an embodiment, the method may include controlling, by the processor 120, the LED 310 disposed in the first controller 300a and the LED 310 disposed in the second controller 300b to be operated at substantially the same light emission period.

According to an embodiment, the method may include detecting, by the processor 120, movements of the first controller 300a and the second controller 300b through at least one of the first recognition camera 213, the second recognition camera 223, and the sensor module 176.

According to an embodiment, the method may include detecting, by the processor 120, positions of the first controller 300a and the second controller 300b through at least one of the first recognition camera 213, the second recognition camera 223, and the sensor module 176.

According to an embodiment, the sensor module 176 may include an inertial measurement sensor configured to measure angular velocity and acceleration of the first controller 300a and the second controller 300b, or a global positioning system (GPS) sensor configured to detect positions of the first controller 300a and the second controller 300b.

According to an embodiment, the method may include controlling, by the processor 120, the LED 310 disposed in the first controller 300a to be turned on and/or off to be operated in a first pattern, and the LED 310 disposed in the second controller 300b to be turned on and/or off to be operated in a second pattern different from the first pattern.

According to an embodiment, the method may include identifying the first controller 300a and the second controller 300b by the processor 120, based on recognizing the first pattern of the LED 310 disposed in the first controller 300a and the second pattern of the LED 310 disposed in the second controller 300b through at least one of the first recognition camera 213 and the second recognition camera 223.

In the above, although the disclosure has been described with reference to various embodiments of the disclosure, it is apparent to those skilled in the art that modifications and changes can be made thereto without departing from the scope of the disclosure as defined by the appended claims.

The invention claimed is:

1. A wearable electronic device comprising:
a wireless communication circuit;
a sensor;
a first recognition camera and/or a second recognition camera;
memory storing instructions; and
at least one processor comprising processing circuitry,
wherein the instructions, when executed by the at least one processor individually or collectively, cause the wearable electronic device to:
identify that a first controller and a second controller, each of which has a light-emitting diode, LED, disposed therein, are detected within a designated space, through at least one of the first recognition camera and the second recognition camera;
transmit, via the wireless communication circuit to the first controller, a control signal which causes the LED disposed in the first controller to be operated at a first turn-on time;
transmit, via the wireless communication circuit to the second controller, a control signal which causes the LED disposed in the second controller to be operated at a second turn-on time; and
based on recognizing that the LED disposed in the first controller is operated at the first turn-on time, control a turn-on time and a recognition operation period of at least one of the first recognition camera and the second recognition camera such that the recognition operation period is longer than light emission timing of the LED disposed in the first controller.

2. The electronic device of claim 1, wherein the at least one processor is configured, individually and/or collectively, to identify the first controller and the second controller based on recognizing timings of the first turn-on time and the second turn-on time through at least one of the first recognition camera and the second recognition camera.

3. The electronic device of claim 1, wherein the at least one processor is configured, individually and/or collectively, to:
in case that the first turn-on time is detected through at least one of the first recognition camera and the second recognition camera, cause at least one of the first recognition camera and the second recognition camera to be operated over a fifth turn-on time longer than the first turn-on time; and
in case that the second turn-on time is detected through at least one of the first recognition camera and the second recognition camera, cause at least one of the first recognition camera and the second recognition camera to be operated over a sixth turn-on time longer than the second turn-on time.

4. The electronic device of claim 1, wherein the at least one processor is configured individually and/or collectively, to cause the LED disposed in the first controller and the LED disposed in the second controller to be operated at substantially the same light emission period.

5. The electronic device of claim 1, wherein the at least one processor is configured, individually and/or collectively, to detect movements of the first controller and the second controller through at least one of the first recognition camera, the second recognition camera, and the sensor module,
wherein the sensor module comprises an inertial measurement sensor configured to measure angular velocity and acceleration of the first controller and the second controller.

6. The electronic device of claim 1, wherein the at least one processor is configured, individually and/or collectively, to detect positions of the first controller and the second controller through at least one of the first recognition camera, the second recognition camera, and the sensor module,
wherein the sensor module comprises a Global Positioning System, 'GPS', sensor configured to detect positions of the first controller and the second controller.

7. The electronic device of claim 1, wherein the LED disposed in the first controller is turned on and/or off to be operated in a first pattern, and wherein the LED disposed in the second controller is turned on and/or off to be operated in a second pattern different from the first pattern,
wherein, the at least one processor is configured to identify the first controller and the second controller, based on recognizing the first pattern of the LED disposed in the first controller and the second pattern of the LED disposed in the second controller through at least one of the first recognition camera and the second recognition camera.

8. The electronic device of claim 1, wherein at least one of the first controller and the second controller is a movable accessory device.

9. A method for identifying, by a wearable electronic device, a first controller and a second controller, the method comprising:
identifying, by at least one processor of the electronic device, that the first controller and the second controller, each of which has an LED disposed therein, are detected within a designated space, through at least one of a first recognition camera and a second recognition camera of the electronic device;
transmitting, by the at least one processor, a first control signal to the first controller which causes the LED disposed in the first controller to be operated at a first turn-on time;
transmitting, by the at least one processor, a second control signal to the second controller which causes the LED disposed in the second controller to be operated at a second turn-on time; and
based on recognizing that the LED disposed in the first controller is operated at the first turn-on time, control a turn-on time and a recognition operation period of at least one of the first recognition camera and the second recognition camera such that the recognition operation period is longer than light emission timing of the LED disposed in the first controller.

10. The method of claim 9, the method further comprising identifying the first controller and the second controller by the at least one processor, based on recognizing timings of the first turn-on time and the second turn-on time through at least one of the first recognition camera and the second recognition camera,
the method further comprising:
in case that the first turn-on time is detected through at least one of the first recognition camera and the second recognition camera, controlling, by the at least one processor, at least one of the first recognition camera and the second recognition camera to be operated over a fifth turn-on time longer than the first turn-on time; and
in case that the second turn-on time is detected through at least one of the first recognition camera and the second recognition camera, controlling, by the at least one processor, at least one of the first recognition camera and the second recognition camera to be operated over a sixth turn-on time longer than the second turn-on time.

11. The method of claim 9, comprising controlling, by the at least one processor, the LED disposed in the first controller and the LED disposed in the second controller to be operated at substantially the same light emission period.

12. The method of claim 9, comprising detecting, by the at least one processor, movements of the first controller and the second controller through at least one of the first recognition camera, the second recognition camera, and the sensor module,
wherein the sensor module comprises an inertial measurement sensor configured to measure angular velocity and acceleration of the first controller and the second controller.

13. The method of claim 9, comprising detecting, by the at least one processor, positions of the first controller and the second controller through at least one of the first recognition camera, the second recognition camera, and the sensor module,
wherein the sensor module comprises a Global Positioning System, 'GPS', sensor configured to detect positions of the first controller and the second controller.

14. The method of claim 9, comprising controlling, by the at least one processor, the LED disposed in the first controller to be turned on and/or off to be operated in a first pattern, and the LED disposed in the second controller to be turned on and/or off to be operated in a second pattern different from the first pattern,
the method further comprising identifying the first controller and the second controller by the at least one processor, based on recognizing the first pattern of the LED disposed in the first controller and the second pattern of the LED disposed in the second controller through at least one of the first recognition camera and the second recognition camera.

15. The method of claim 9, wherein at least one of the first controller and the second controller is a movable accessory device.

16. The electronic device of claim 1, wherein the at least one processor is configured, individually and/or collectively, to:
in a case that the first turn-on time is detected through at least one of the first recognition camera and the second recognition camera, cause at least one of the first recognition camera and the second recognition camera to be operated over a third turn-on time longer than the first turn-on time.

17. The method of claim 9, the method further comprising in a case that the first turn-on time is detected through at least one of the first recognition camera and the second recognition camera, causing at least one of the first recognition camera and the second recognition camera to be operated over a third turn-on time longer than the first turn-on time.

* * * * *